United States Patent
Wang

(10) Patent No.: US 9,615,085 B2
(45) Date of Patent: Apr. 4, 2017

(54) METHOD AND SYSTEM FOR STRUCTURAL SIMILARITY BASED RATE-DISTORTION OPTIMIZATION FOR PERCEPTUAL VIDEO CODING

(75) Inventor: Zhou Wang, Waterloo (CA)

(73) Assignee: Zhou Wang, Waterloo, ON (CA)

( * ) Notice: Subject to any disclaimer, the term of this patent is extended or adjusted under 35 U.S.C. 154(b) by 163 days.

(21) Appl. No.: 14/125,442

(22) PCT Filed: Jun. 14, 2012

(86) PCT No.: PCT/CA2012/000594
§ 371 (c)(1),
(2), (4) Date: Dec. 11, 2013

(87) PCT Pub. No.: WO2012/171113
PCT Pub. Date: Dec. 20, 2012

(65) Prior Publication Data
US 2014/0119432 A1 May 1, 2014

Related U.S. Application Data

(60) Provisional application No. 61/496,923, filed on Jun. 14, 2011.

(51) Int. Cl.
*H04N 7/12* (2006.01)
*H04N 19/12* (2014.01)
(Continued)

(52) U.S. Cl.
CPC ..... *H04N 19/00078* (2013.01); *H04N 19/124* (2014.11); *H04N 19/147* (2014.11);
(Continued)

(58) Field of Classification Search
IPC ....................................... H04N 19/19
See application file for complete search history.

(56) References Cited

U.S. PATENT DOCUMENTS

2006/0262979 A1 11/2006 Srinivasan et al.
2007/0230568 A1* 10/2007 Eleftheriadis .......... H04N 19/46
375/240.1
(Continued)

FOREIGN PATENT DOCUMENTS

| CN | 101919255 A | 12/2010 |
|---|---|---|
| TW | 201121333 A | 6/2011 |
| WO | 2010033565 A1 | 3/2010 |

OTHER PUBLICATIONS

WIPO, International Search Report and Written Opinion for PCT Application No. PCT/CA2012/000594 dated Oct. 22, 2012.
(Continued)

*Primary Examiner* — Tracy Li
(74) *Attorney, Agent, or Firm* — Norton Rose Fulbright Canada LLP

(57) ABSTRACT

There is disclosed a system and method for video coding, and more particularly to video coding that uses structural similarity (SSIM) based rate-distortion optimization methods to improve the perceptual quality of decoded video without increasing data rate, or to reduce the data rate of compressed video stream without sacrificing perceived quality of the decoded video. In an embodiment, the video coding system and method may be a SSIM-based rate-distortion optimization approach that involves minimizing a joint cost function defined as the sum of a data rate term and a distortion functions. The distortion function may be defined to be monotonically increasing with the decrease of SSIM and a Lagrange parameter may be utilized to control the trade-off between rate and distortion. The optimal Lagrange parameter may be found by utilizing the ratio between a reduced-reference SSIM model with respect to quantization step, and a data rate model with respect to quantization step. In an embodiment, a group-of-picture (GOP) level quantization parameter (QP) adjustment
(Continued)

method may be used in multi-pass encoding to reduce the bit-rate while keeping similar perceptual video quality. In another embodiment, a frame level QP adjustment method may be used in single-pass encoding to achieve constant SSIM quality. In accordance with an embodiment, the present invention may be implemented entirely at the encoder side and may or may not require any change at the decoder, and may be made compatible with existing video coding standards.

17 Claims, 12 Drawing Sheets

(51) Int. Cl.
*H04N 19/176* (2014.01)
*H04N 19/147* (2014.01)
*H04N 19/172* (2014.01)
*H04N 19/124* (2014.01)
*H04N 19/154* (2014.01)
*H04N 19/177* (2014.01)
*H04N 19/19* (2014.01)
*H04N 19/192* (2014.01)
*H04N 19/87* (2014.01)

(52) U.S. Cl.
CPC ......... *H04N 19/154* (2014.11); *H04N 19/172* (2014.11); *H04N 19/176* (2014.11); *H04N 19/177* (2014.11); *H04N 19/19* (2014.11); *H04N 19/192* (2014.11); *H04N 19/87* (2014.11)

(56) References Cited

U.S. PATENT DOCUMENTS

| | | | |
|---|---|---|---|
| 2009/0148058 A1* | 6/2009 | Dane | H04N 5/145 382/251 |
| 2011/0142124 A1 | 6/2011 | Huang et al. | |
| 2011/0150113 A1* | 6/2011 | Oyman | H04L 1/0019 375/260 |
| 2011/0170591 A1* | 7/2011 | Li | H04N 19/105 375/240.01 |

OTHER PUBLICATIONS

Huang et al., "Perceptual Rate Distortion Optimization Using Structural Similarity Index as Quality Metric", IEEE Transactions on Circuits and Systems for Video technology, Nov. 11, 2010, vol. 20, No. 11, pp. 1614-1624.
Chinese State IP Office, Office Action for CN Application No. 201280039615.4 dated Jul. 22, 2016.
Chinese State IP Office, Search Report for CN Application No. 201280039615.4 dated Jul. 11, 2016.
Shiqi Wang et al., Rate-SSIM Optimization for Video Coding, 2011 IEEE International Conference on Acoustics, Speech and Signal Processing (ICASSP, May 22-27, 2011, pp. 833-836, Prague.
Zhou Wang et al., Video quality assessment using a statistical model of human visual speed perception, Journal of the Optical Society of America A: Optics, Image Science and Vision, Dec. 2007, pp. B61-B69, vol. 24, No. 12.

* cited by examiner

Algorithm 1: Summary of the proposed RDO. (GOP structure: IPP)

begin
    Calculate $\lambda_i$ for the $i^{th}$ frame
    switch *the value of i* do
        case *0,1,2,3*
$$\lambda_i \leftarrow \lambda_{HR}$$
        endsw
        otherwise
            1) DCT transform of the input frame.
$$2)\ \lambda_i \leftarrow \begin{cases} \lambda_{HR} & H = 0 \\ \frac{\frac{dSSIM}{dQ}}{\frac{dR}{dQ}} & otherwise \end{cases}$$
        endsw
    endsw
end
begin
    For each MB in the frame
        1) Calculate the scale factor at MB level $\eta$.
        2) Adjust the Lagrange multiplier:
$$\lambda'_i \leftarrow \eta \cdot \lambda_i$$
        3) Calculate the RD cost for each Mode $k$:
$$J_k \leftarrow 1 - SSIM_k + \lambda'_i \cdot R_k$$
        4) Select the Mode $j$ with minimal RD cost.
        5) Encode the MB with Mode $j$.
end
begin
    Update $\Lambda_i$, $\dot{S}$, $\Lambda$, $\omega_{avg}$ and $v_g$.
end

FIG. 7

METHOD AND SYSTEM FOR STRUCTURAL SIMILARITY BASED RATE-DISTORTION OPTIMIZATION FOR PERCEPTUAL VIDEO CODING

CROSS-REFERENCE TO RELATED APPLICATIONS

The present application claims the benefit of U.S. Provisional Application No. 61/496,923 filed on Jun. 14, 2011, the entirety of which is incorporated herein by reference.

FIELD OF THE INVENTION

This invention relates in general to video coding and more particularly to video coding that uses structural similarity-based rate-distortion optimization methods to improve the perceptual quality of decoded video without increasing data rate, or to reduce the data rate of compressed video stream without sacrificing perceived quality of the decoded video.

BACKGROUND OF THE INVENTION

Digital images are subject to a wide variety of distortions during acquisition, processing, compression, storage, transmission and reproduction, any of which may result in a degradation of visual quality. For applications in which images are ultimately to be viewed by human beings, the most reliable method of quantifying visual image quality, is through subjective evaluation. In practice, however, subjective evaluation is usually too inconvenient, time-consuming and expensive. Objective image quality metrics may predict perceived image quality automatically. The simplest and most widely used quality metric is the mean squared error (MSE), computed by averaging the squared intensity differences of distorted and reference image pixels, along with the related quantity of peak signal-to-noise ratio (PSNR). But they are found to be poorly matched to perceived visual quality. In the past decades, a great deal of effort has gone into the development of advanced quality assessment methods, among which the structural similarity (SSIM) index achieves an excellent trade-off between complexity and quality prediction accuracy, and has become the most broadly recognized image/video quality measure by both academic researchers and industrial implementers.

In general, video coding schemes often involve finding the best trade-off between data rate R and the allowed distortion D—the so called rate-distortion optimization (RDO). An overall rate-distortion cost function may be defined with both R and D terms, and a Lagrange parameter may be used to control the relative weights of the two terms. The goal of RDO is to find the best Lagrange parameter. Existing video coding techniques use the sum of absolute difference (SAD) or sum of square difference (SSD) to define distortion D, which have been widely criticized in the literature because of their poor correlation with perceptual image quality. In order to maximize the perceptual quality of a compressed video stream for given data rate or to minimize the data rate without losing perceptual quality, it is desirable to use a perceptually more meaningful image quality measure such as SSIM to define D. However, when the distortion function D in RDO is defined using a perceptual quality measure such as the SSIM index, finding the optimal Lagrange parameter can be difficult due to more complex mathematical structure of the SSIM index.

In general, a coded video stream may be composed of multiple groups of pictures (GOPs). Each GOP starts with an I-frame, that is coded independently, and includes all frames up to, but not including, the next I-frame. For example, the MPEG4/H.264 AVC standard encodes pictures with a fixed GOP length in the general reference encoder, even though it allows variable GOP length.

A video sequence usually consists of various scenes where every scene can be categorized in terms of its visual information, content complexity and activity. As a result, the whole video sequence can be divided into GOPs based on properties of the visual content in such a way that the pictures in each GOP have similar perceptual importance. In order to achieve good perceptual video quality within a given rate budget, it is useful to divide the bits among various GOPs considering the relative perceptual importance of each GOP. This can be achieved by adjusting the quantization level of each GOP based on its perceptual importance. Multi-pass encoding is a video encoding technique where the first encoding pass analyzes the video and logs down information which can then be used in the second and subsequent passes, to adjust the bit-rate of each GOP to optimize for the maximum perceptual video quality. However, a multi-pass system cannot be employed for real-time applications because it. In such a case, a single-pass system can be used to perform the bit rate allocation among various GOPs based on already encoded frames.

A practical approach to develop an objective video quality assessment (VQA) method with good accuracy is to employ an IQA method that has low computational complexity and achieves high prediction accuracy such as SSIM. The final quality score can be obtained by weighted averaging of quality scores of individual pictures/frames in a video. Previous studies have shown that assigning larger weight to high distortion regions generally has positive effect on the performance of IQA/VQA methods. Since, the final score is mainly influenced by the frames with higher distortion, therefore the similar perceptual quality can be achieved by using high quantization level for the GOPs with high quality such that IQA performance is more uniform over all the frames in the video sequences. As a result, similar perceptual quality can be achieved by using significantly lower bit-rate.

SUMMARY OF THE INVENTION

In one aspect, the present disclosure relates to a method for video coding comprising an SSIM-based rate-distortion optimization approach.

In another aspect the present disclosure relates to a method for video coding utilizing a SSIM-based rate-distortion optimization approach that comprises at least some of the following steps: minimizing a joint cost function defined as the sum of a Lagrange multiplier scaled data rate term and an SSIM-based distortion function; utilizing a Lagrange parameter to control trade-off between rate and distortion; finding the optimal Lagrange parameter by the ratio between the derivative of SSIM with respect to quantization step and the derivative of data rate with respective quantization step; utilizing a predictive model to estimate the derivative of SSIM with respect to quantization step; and utilizing a rate model to estimate the derivative of data rate with respect to quantization step.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

In another aspect the present disclosure relates to a method for multi-pass video encoding that allocates the bit-rate among GOPs based on a distortion model, so as to allocate lower rate to the GOPs with high quality/lower distortion. Specifically, the first encoding pass analyzes the video and logs down information which can then be used in the second and subsequent passes, to adjust and fine tune the bit-rate of each GOP to optimize for the maximum perceptual video quality.

In yet another aspect the present disclosure relates to a method for single-pass video encoding that allocates the bit-rate among frames based on a causal predictive distortion model, so as to maintain a constant perceptual quality across all frames in a video sequence.

DESCRIPTION OF THE DRAWINGS

The invention will be better understood and objects of the invention will become apparent when consideration is given to the following detailed description thereof. Such description makes reference to the annexed drawings wherein:

FIG. 7 is a diagram summarizing the general framework of an embodiment of the present invention for IPP GOP structure;

Figure 1:
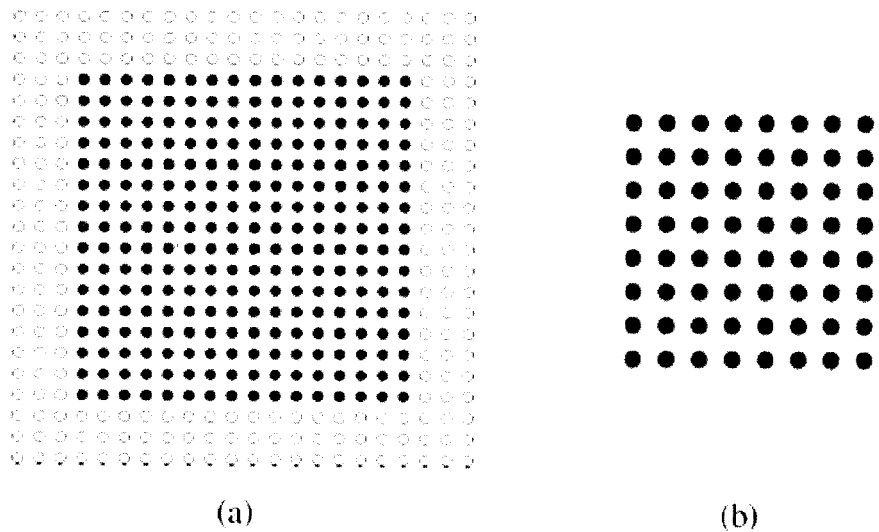
FIG. 1 is a set of graphs illustrating the neighboring pixels that may be utilized by an embodiment of the present invention to compute SSIM.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present disclosure relates to a system and method for video coding. In accordance with an embodiment, the video coding system and method may be SSIM-based rate-distortion optimization approach that involves minimizing a joint cost function defined as the sum of a Lagrange multiplier scaled data rate term and a distortion function. The distortion function may be defined to be monotonically increasing with the decrease of SSIM and a Lagrange parameter may be utilized to control the trade-off between rate and distortion. The present invention may generally be utilized to improve the perceptual quality of decoded video without increasing data rate, or to reduce the data rate of compressed video stream without sacrificing perceived quality of the decoded video.

One embodiment of the present invention may be using the ratio between two factors to solve for the Lagrange parameters. The first factor utilized may be the derivative of SSIM with respect to the quantization step Q, and the second factor may be the derivative of the rate R with respect to Q. To compute the first factor, an SSIM prediction model of an embodiment of the present invention may be operable to use the statistics of the reference frame only (so called a reduced-reference method that does not need access to the coded frame). A relationship may then be established between the SSIM prediction model and quantization step Q by utilizing the variance statistics of transform domain coefficients in the reference frame as well as a prior probability model of transform coefficients, such as discrete cosine transform (DCT) coefficients. To compute the second factor, a rate model may be used that may be computed by utilizing the quantization step, an entropy model that excludes the bit rate of skipped blocks, and a prior statistical model of transform coefficients.

One embodiment of the present invention may utilize at a macroblock (MB) level a Lagrange parameter adjustment scheme, where the scale factor for each MB is determined by an information theoretical approach based on the motion information content and perceptual uncertainty of visual speed perception.

Prior art video codecs are primarily characterized in terms of the throughput of the channel and the perceived distortion of the reconstructed video. Thus, the fundamental issue in video coding is to obtain the best trade-off between the rate and perceived distortion. The process used to achieve this objective is commonly known as Rate Distortion Optimization (RDO). Mathematically, the RDO problem can be written as follows $$\min\{D\} \text{ subject to } R \leq R_c \quad (1)$$

where D is the distortion for a given rate budget $R_c$. This is a typical constrained optimization problem which can be converted to an unconstrained optimization problem by $$\min\{J\} \text{ where } J = D + \Lambda \cdot R \quad (2)$$

where J is called the Rate Distortion (RD) cost and the rate R is measured in number of bits per pixel. $\Lambda$ is known as the Lagrange multiplier parameter which controls the trade-off between R and D.

In an embodiment of the present invention, SSIM may be utilized to define the distortion measure, and an adaptive RDO scheme for mode selection may be derived based on such a new distortion model. In an embodiment, a system or method of the present invention may comprise: (i) employing SSIM as the distortion measure in the mode selection scheme, where both the current macroblock (MB) to be coded and neighbouring pixels are taken into account to fully exploit the properties of SSIM; (ii) presenting at the frame level an adaptive Lagrange parameter selection scheme based on a statistical reduced-reference SSIM model and a source-side information combined rate model; and (iii) presenting at the MB level a Lagrange parameter adjustment scheme, where the scale factor for each MB is determined by an information theoretical approach based on the motion information content and perceptual uncertainty of visual speed perception.

In an embodiment, the present invention the SSIM motivated RDO problem may be defined as $$\min\{J\} \text{ where } J = (1-SSIM) + \Lambda \cdot R \quad (3)$$

The SSIM may be defined in their pixel domain between two groups of pixels or in the transform domain (e.g., DCT domain) between two sets of transform coefficients. In the pixel domain, the SSIM between two groups of pixels may be one or more of the following components: (i) the ratio between [the product of the mean intensity values of the two groups of pixels plus a constant] and [one, or the sum, of the squared mean intensity values plus a constant]; (ii) the ratio between [the product of the standard deviation values of both groups of pixels plus a constant] and [signal energy based on one, or the sum, of the variances of the two groups of pixels plus a constant]; or (iii) the ratio between [the cross-correlation between two groups of pixel intensities plus a constant] and [the product of the standard deviation values of the two groups of pixels plus a constant]. The standard definition of SSIM is the product of the following three components $$l(x, y) = \frac{2\mu_x \mu_y + C_1}{\mu_x^2 + \mu_y^2 + C_1}, \quad (4)$$

$$c(x, y) = \frac{2\sigma_x \sigma_y + C_2}{\sigma_x^2 + \sigma_y^2 + C_2},$$

$$s(x, y) = \frac{\sigma_{xy} + C_3}{\sigma_x \sigma_y + C_3},$$

where $\mu_x$, $\sigma_x$ and $\sigma_{xy}$ denote mean, standard deviation and cross correlation, respectively; $C_1$, $C_2$ and $C_3$ are constants used to avoid instability when the means and variances are close to zero. However, there may be other variations, for example, (i) using one of two of the three components only; (ii) raising one or more of the components to certain power; (iii) using summation rather than multiplication to combine the components; or (iv) using one but not both of the $\mu$ and $\sigma$ terms in the denominators. The SSIM index of the whole image is obtained by averaging the local SSIM indices calculated using a sliding window.

The SSIM index may be also be defined using transform domain coefficients, for example, DCT coefficients. The SSIM between two groups of transform coefficients may be computed using one or more of the following components: (i) the ratio between [the product of DC values plus a constant] and [one, or the sum, of DC intensity values plus a constant]; and (ii) ratio between [the cross-correlation between two groups of AC coefficients plus a constant] and [signal energy based on the variance(s) of one or both groups of AC coefficients plus a constant]. The DCT domain SSIM between two sets of coefficients X and Y may be computed as $$SSIM(x, y) = \left\{1 - \frac{(X(0) - Y(0))^2}{X(0)^2 + Y(0)^2 + N \cdot C_1}\right\} \times \quad (5)$$

$$\left\{1 - \frac{\sum_{k=1}^{N-1}(X(k) - Y(k))^2}{\sum_{k=1}^{N-1}(X(k)^2 + Y(k)^2) + N \cdot C_2}\right\}$$

where X(0) and Y(0) are the DC coefficients, and X(k) and Y(k) for k=1, . . . , N−1 are AC coefficients, respectively; $C_1$ and $C_2$ are constants used to avoid instability when the means and variances are close to zero and N denotes the block size. As in the pixel domain case, similar variations in the definition of SSIM may also be applied here in the transform domain.

In the case of color video, for example with Y, Cb and Cr components, the SSIM index may be computed as a weighted average of all components to obtain a single SSIM measure $$SSIM_w = W_Y \cdot SSIM_Y + W_{Cb} \cdot SSIM_{Cb} + W_{Cr} \cdot SSIM_{Cr} \quad (6)$$

where $W_Y$, $W_{Cb}$, and $W_{Cr}$ are the weights of Y, Cb and Cr components, respectively and are defined as $W_Y=0.8$ and $W_{Cb}=W_{Cr}=0.1$, respectively.

In the conventional mode selection process, the final coding mode may be determined by the number of entropy coded bits and the distortion of the residuals in terms of MSE, while the properties of the reference image are ignored. Unlike MSE, the SSIM index is totally adaptive according to the reference signal. Therefore, the properties of video sequences may also be exploited when utilizing SSIM to define the distortion model.

A system or method in accordance with an embodiment of the present invention may be incorporated with video coding standard such as MPEG4/H.264 AVC video coding, where the encoder processes a frame of video in units of non-overlapping MBs. However, the SSIM index is calculated with the help of a sliding window, which moves pixel-by-pixel over the entire frame. To bridge this gap, in accordance with an embodiment of the present invention, the SSIM index between the reconstructed MB and the original MB may be calculated using a larger window, which includes the current MB to be coded and the surrounding pixels, as shown in FIG. 1. FIG. 1 is a set of graphs illustrating the neighboring pixels that may be utilized in accordance with an embodiment of the present invention to compute SSIM. Since the smallest size of modes in current coding standard such as MPEG4/H.264 AVC is 4×4, the size of sliding window used to calculate SSIM index may be set to be 4×4. For Y component, the SSIM index of the current 16×16 MB to be encoded may be calculated within a 22×22 block (FIG. 1(a)) by using a sliding window. In the case of 4:2:0 format, for Cb and Cr components, the SSIM index may be calculated using 14×14 window (FIG. 1(b)). This may also help to alleviate the problem of discontinuities at the MB boundaries in the decoded video. When the MB is on the frame boundaries, a system or method in accordance with the present invention may ignore the surrounding pixels in the distortion calculation and only use the MB to be coded for comparison.

The Lagrange parameter may be obtained by calculating the derivative of J with respect to R, then setting it to zero, and finally solving for $\Lambda$, $$\frac{dJ}{dR} = -\frac{dSSIM}{dR} + \lambda = 0 \qquad (7)$$

which yields $$\lambda = \frac{dSSIM}{dR} = \frac{\frac{dSSIM}{dQ}}{\frac{dR}{dQ}} \qquad (8)$$

where Q is the quantization step. This implies that, in order to estimate $\Lambda$ before actually encoding the current frame, a system or method in accordance with the present invention may be required to establish accurate models for how SSIM varies as a function of quantization step Q and how the rate varies as a function of quantization step Q.

In one embodiment of the present invention, a reduced-reference (RR) SSIM predictive model may be utilized to estimate the SSIM index. Thus, a system or method in accordance with an embodiment of the present invention may divide each frame into 4×4 non-overlapping blocks and perform DCT transform on each block. In this way, a system or method in accordance with the present invention may obtain the statistical properties of the reference signal, which is consistent with the design philosophy of the SSIM index. Furthermore, a system or method in accordance with an embodiment of the present invention may group the DCT coefficients having the same frequency from each 4×4 DCT window into one sub-band, resulting in 16 sub-bands. An RR distortion measure of an embodiment of the present invention may be defined as $$M_{RR} = \left(1 - \frac{D_0}{2\sigma_0^2 + C_1}\right)\left(1 - \frac{1}{N-1}\sum_{i=1}^{N-1}\frac{D_i}{2\sigma_i^2 + C_2}\right) \qquad (9)$$

where $\sigma_i$ is the standard deviation of the $i^{th}$ subband and N is the block size. $D_i$ represents the MSE between the original and distorted frames in the i-th sub-band. To estimate $D_i$, a system or method in accordance with an embodiment of the present invention may assume a prior probability model of the transform coefficients (such as DCT coefficients) of the frame prediction residuals. The prior probability model may be of a various types, for example, in one embodiment of the present invention, it can be a Laplace density model given by $$f_{Lap}(x) = \frac{\Lambda}{2} \cdot e^{-\Lambda \cdot |x|} \qquad (10)$$

The value of $D_i$ may then be estimated as follows $$D_i = \int_{-(Q-\gamma Q)}^{(Q-\gamma Q)} x_i^2 f_{Lap}(x_i) dx_i + \qquad (11)$$
$$2\sum_{n=1}^{\infty}\int_{nQ-\gamma Q}^{(n+1)Q-\gamma Q}(x_i - nQ)^2 f_{Lap}(x_i) dx_i$$

where $\gamma$ is the rounding offset in the quantization.

Figure 2:
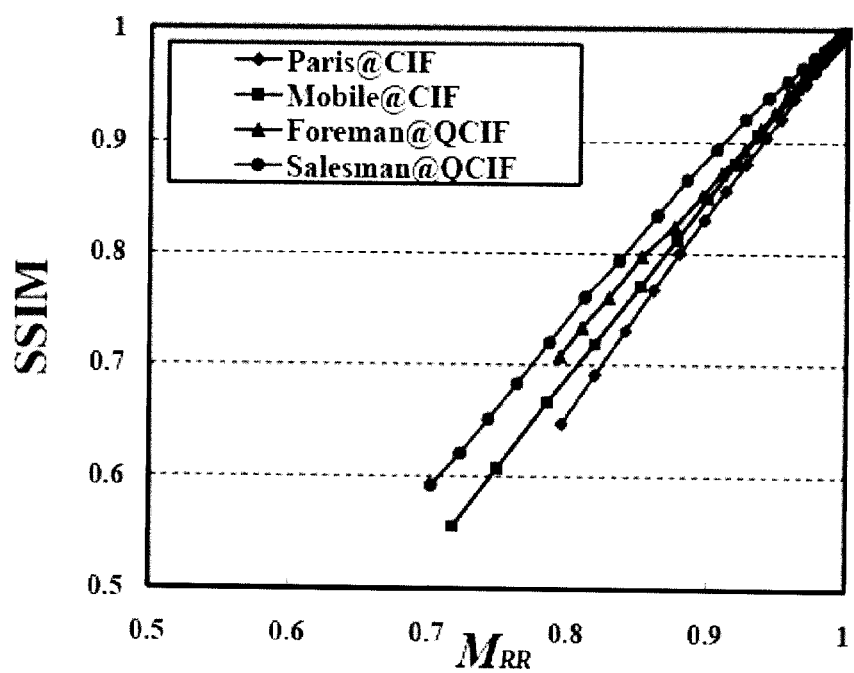
FIG. 2 is graph illustrating the relationship between SSIM and the reduced-reference model $M_{RR}$ of an embodiment of the present invention.

FIG. 2 shows the relationship between the reduced reference measure $M_{RR}$ 22 and the SSIM index 20, which may differ for four different video sequences. The testing QP values in FIG. 2 are from 0 to 50 with an interval of 2. The results are for four standard test video sequences, which are Paris at CIF format, Mobile at CIF format, Forman at QCIF format, and Salesman at QCIF format. The SSIM index and $M_{RR}$ are calculated by averaging the respective values of individual frames.

Interestingly, the inventor found that $M_{RR}$ exhibits a nearly perfect linear relationship with SSIM for each individual video sequence. This may be an outcome of the similarity between their design principles of (4), (5) and (9). Such clean linear relationship may give the present invention significant advantages over prior art, and may assist in designing an SSIM predictor based on $M_{RR}$. More specifically, an RR-SSIM estimator in accordance with an embodiment of the present invention may be written as $$\hat{S} = \alpha + \beta \cdot M_{RR} \qquad (12)$$

The RR-SSIM model in accordance with an embodiment of the present invention may be based on the features extracted from the original frames in the DCT domain and/or the pixel domain. To estimate the parameters $\alpha$ and $\beta$ in (12), a system or method in accordance with an embodiment of the present invention may utilize two points on the straight line relating $\hat{S}$ and $M_{RR}$. In an embodiment, (1, 1) may be utilized as one of the points as it is always located on the line and also because it does not require any computation. To find the second point is difficult, because the SSIM index $\hat{S}$ and the Laplace parameter for each subband are not available since the current frame has not been encoded yet. Therefore, a system or method in accordance with an embodiment of the present invention may estimate them from the previous frames of the same type. The distortion measure $M_{RR}$ may be calculated by incorporating (11) into (10), and the standard deviation of the $i^{th}$ subband $\sigma_i$ is calculated by DCT transform of the original frame. This procedure executed by a system or method in accordance with an embodiment of the present invention provides us with the second point required to find out $\alpha$ and $\beta$.

One embodiment of the present invention may include a rate model that is derived based on an entropy model that excludes the bit rate of the skipped blocks $$H = (1 - P_s) \cdot \left[-\frac{P_0 - P_s}{1 - P_s} \cdot \log_2 \frac{P_0 - P_s}{1 - P_s} - 2\sum_{n=1}^{\infty}\frac{P_n}{1 - P_s} \cdot \log_2 \frac{P_n}{1 - P_s}\right] \qquad (13)$$

where $P_s$ is the probability of skipped blocks, $P_0$ and $P_n$ are the probabilities of transformed residuals quantized to the zero-th and n-th quantization levels, respectively, which may be modeled by utilizing the Laplace distribution as follows $$P_0 = \int_{-(Q-\gamma Q)}^{(Q-\gamma Q)} f_{Lap}(x)dx \qquad (14)$$

$$P_n = \int_{nQ-\gamma Q}^{(n+1)Q-\gamma Q} f_{Lap}(x)dx$$

Figure 3:
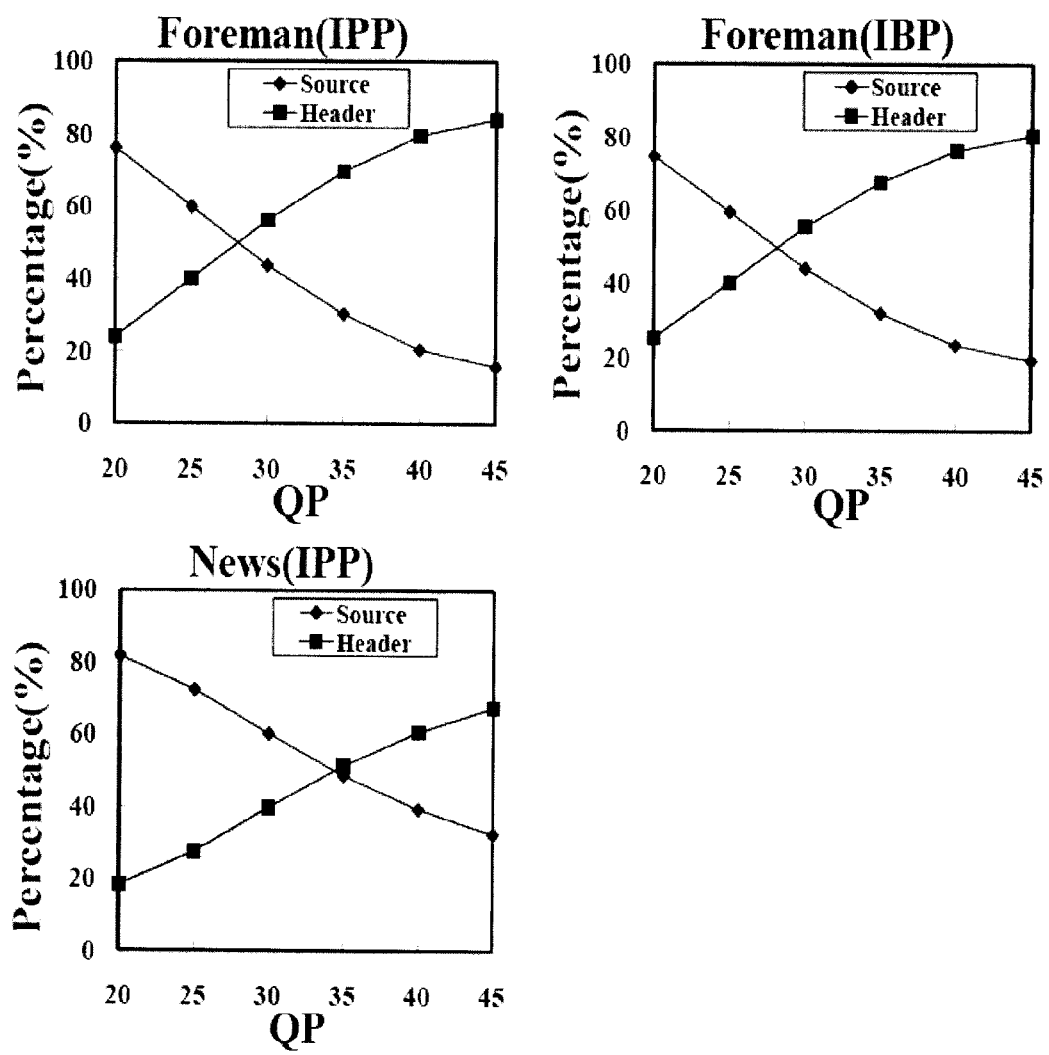
FIG. 3 is a set of graphs illustrating average percentages of header bits and source bits at various QP values.

In state-of-the-art video coding standards such as MPEG4/H.264 AVC, the side information (or header bits) may take a large portion of the total bit rate, especially in low bit rate video coding scenario, as illustrated in FIG. 3.

FIG. 3 is a set of graphs illustrating average percentages of header bits and source bits at various QP values. In state-of-the-art video coding standards such as MPEG4/H.264 AVC, the side information (or header bits) may take a portion of the total bit rate, especially in low bit rate video coding scenario. In each of the sub-drawings, the horizontal axis is the QP value and vertical axis is the percentage of bits in the overall coded stream, and the two curves are for source bits and header bits, respectively. The results are shown for three video sequences, which are "Foreman" sequence with IPP GOP format 30, the "Foreman" sequence with IBP GOP format 32, and the "News" sequence with IPP GOP format 34. In the rate model of prior art methods, only the source bits were considered, and in the present invention, both source and side information bits may be taken into consideration.

For the same quantization step, a larger A indicates small residuals, leading to a larger proportion of the side information. For total bit rate R, there is an approximately linear relationship between ln(R/H) and Λ·Q, as can be seen in FIGS. 4 and 5.

Figure 4:
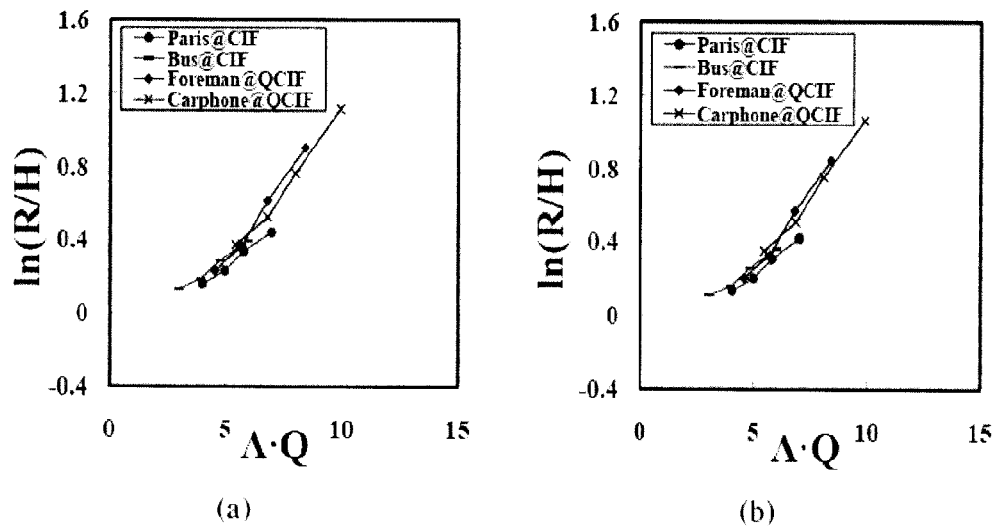
FIG. 4 is a set of graphs that reflect the relationship between ln(R/H) and Λ·Q for IPP GOP structure for different sequences.

FIG. 4 is a set of graphs that reflect the relationship between ln(R/H) and Λ·Q for IPP GOP structure for four standard test video sequences, which include "Paris" at CIF format, "Bus" at CIF format, "Forman" at QCIF format, and "Carphone" at QCIF format. The results include both CAVLC entropy coding 40, and CABAC entropy coding 42. The important observation is that there is an approximately linear relationship between ln(R/H) and Λ·Q. This allows for estimating R from H, Λ and Q in an embodiment of the present invention.

Figure 5:
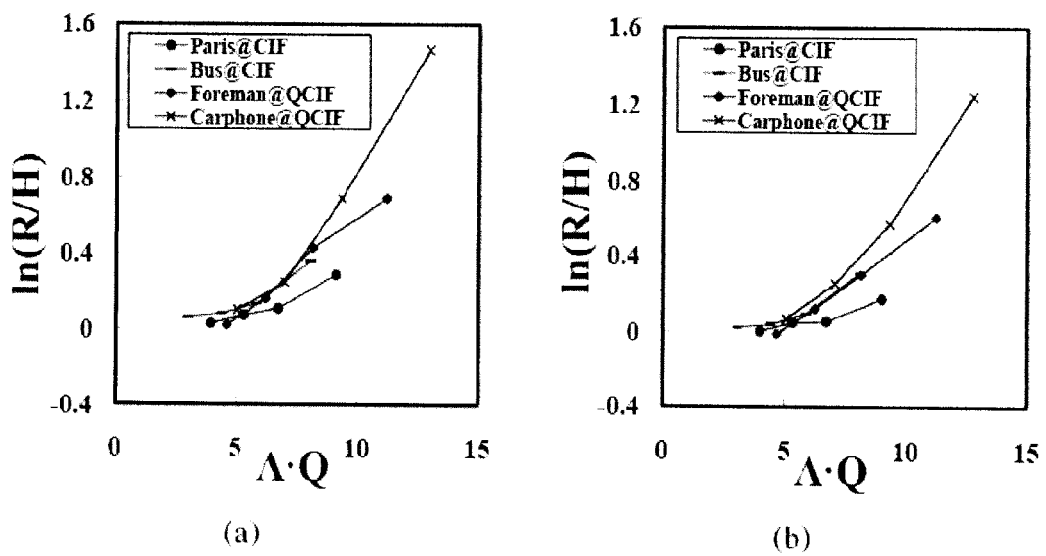
FIG. 5 is a set of graphs that reflect the relationship between ln(R/H) and Λ·Q for B frame of different sequences.

FIG. 5 is a set of graphs that reflect the relationship between ln(R/H) and Λ·Q for B frame four standard test video sequences, which include "Paris" at CIF format, "Bus" at CIF format, "Forman" at QCIF format, and "Carphone" at QCIF format. The results include both CAVLC entropy coding 50, and CABAC entropy coding 52. The important observation is that there is an approximately linear relationship between ln(R/H) and Λ·Q. This allows for estimating R from H, Λ and Q in an embodiment of the present invention.

Figure 6:
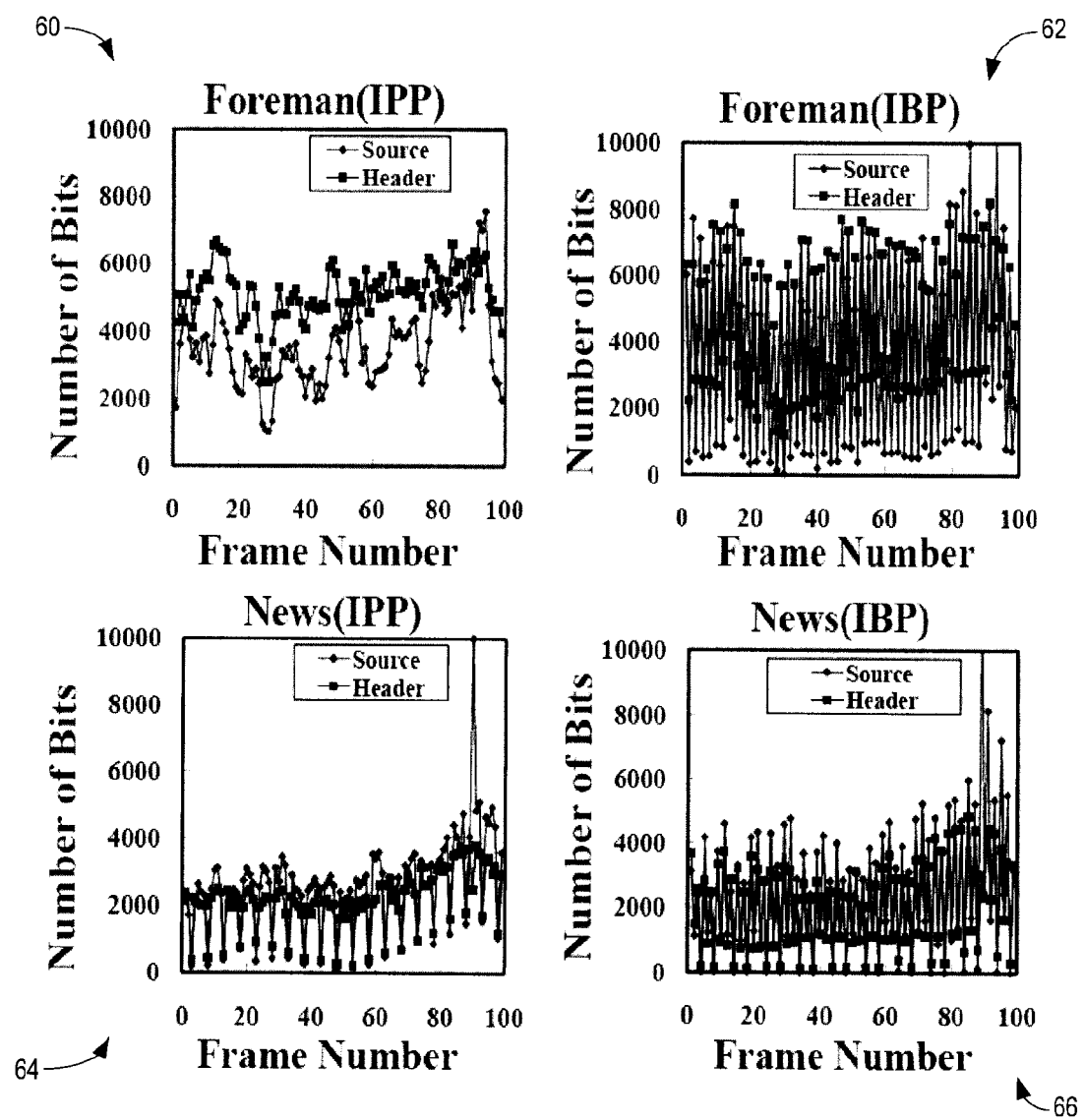
FIG. 6 is a set of graphs illustrating source bits and header bits for each frame at QP=30.

The relationship is totally consistent with the effect of dependent entropy coding and side information. In high bit rate video coding scenario, the effect of dependent entropy coding compensates the side information and ln(R/H) approaches zero; while for low bit rate ln(R/H) becomes larger because of the dominating effect of side information, as illustrated in FIGS. 4 and 5. FIG. 6 is a set of graphs illustrating coded number of source bits and header bits at QP=30 as functions of frame number for two video sequences for two GOP structures, specifically, "Forman" sequence of IPP GOP structure, "Forman" sequence of IBP GOP structure, "News" sequence of IPP GOP structure, and "News" sequence of IBP GOP structure. In all cases, the number of header bits and the number of source bits change monotonically. This helps the estimation of the total rate R by an embodiment of the present invention. FIG. 6 illustrates the source and header bits as functions of frame number for two video sequences of two different GOP structures, where the number of header bits change monotonically with that of the source bits. In accordance with an embodiment of the present invention, the final rate model R may be approximated by $$R = H \cdot e^{\epsilon \Lambda Q + \psi} \qquad (15)$$

It can be observed from FIGS. 4 and 5 that the parameters ε and ψ are not very sensitive to the video content. The slope of B frames is smaller than those of I and P frames. It is mainly due to the fact that in case of B frames the residuals are relatively smaller, resulting in a larger value of Λ. Therefore, in accordance with an embodiment of the present invention, for both CAVLC and CABAC entropy coding methods, ε and ψ may be set empirically to be $$\xi = \begin{cases} 0.03 & B \text{ frame} \\ 0.07 & \text{Otherwise} \end{cases} \quad \psi = \begin{cases} -0.07 & B \text{ frame} \\ -0.1 & \text{Otherwise} \end{cases} \qquad (16)$$

Based on the statistical model of the transformed residuals, a system or method in accordance with an embodiment of the present invention may obtain the final closed form solutions of the R and D models. The R and D models may be functions of two sets of variables: Q and the other variables that describe the inherent properties of video sequences such as Λ and $\sigma_i$. When Q varies within a small range, it may be regarded as independent with the other variables. In a system or method in accordance with an embodiment of the present invention, before coding the current frame, the frame level Lagrange parameter may be determined by incorporating the closed forms of R and D into (8).

The relationship among the Lagrange parameter Λ, the corresponding rate R, and the distortion D may be analyzed in accordance with an embodiment of the present invention. A larger Λ may result in a higher D and a lower R and vice versa, which implies that the rate and perceptual distortion of each MB may be influenced by adjusting its Lagrange parameter. A system or method in accordance with the present invention may include a scheme that assigns more bits to the MBs which are more important as far as the human visual system is concerned.

The human visual system may be regarded as an optimal information extractor and the local components that contain more information attract more visual attention. A system or method in accordance with the present invention may include a scheme that models the visual perception by the motion information content and/or the perception uncertainty derived based on an information communication framework. A system or method in accordance with an embodiment of the present invention may further define the relative motion vector, $v_r$, as the difference between the absolute motion vector, $v_a$, and global background motion vector $v_g$.

In accordance with an embodiment of the present invention, the visual judgment of the speed of motion may be modeled by combining some prior knowledge of the visual world and the current noisy measurements. Based on this approach, the motion information content may be estimated in accordance with an embodiment of the present invention by the self-information of the relative motion $$I = \phi \log v_r + v \qquad (17)$$

The perceptual uncertainty may be estimated by the entropy of the likelihood function of the noisy measurement, which may be computed as $$U = \log v_g - \tau \log c + \delta \qquad (18)$$

where $\phi$, $v$, $\tau$ and $\delta$ are constants. The spatiotemporal importance weight function is given by $$\omega = I - U = \sigma \log v_r + \{\log v_g - \tau \log c + \delta\} \qquad (19)$$

where the contrast measure c can be derived by $$c = 1 - e^{-(c'/\phi)^K} \qquad (20)$$
$$c' = \frac{\sigma_p}{\mu_p + \mu_0}$$

where $\sigma_p$ and $\mu_p$ are computed within the MB, representing the standard deviation and the mean, respectively. The parameters k and $\phi$ are constants to control the slope and the position of the functions, respectively. $\mu_0$ is a constant to avoid instability near 0.

The global motion does not influence the perceptual weight of each MB, thus the weight for each MB is defined as $$\omega = \log\left(1 + \frac{v_r}{v_0}\right) + \log\left(1 + \frac{c}{c_0}\right) \qquad (21)$$

where $v_0$ and $c_0$ are constants. This weight function increases monotonically with the relative motion and the local contrast, which is in line with the philosophy of visual attention. In accordance with an embodiment of the present invention, the MBs with higher weights may be allocated more bits and vice versa. A system or method in accordance with an embodiment of the present invention may adjust the Lagrange multiplier by $$\lambda' = \eta \cdot \lambda \qquad (21)$$

To determine the adjustment factor $\eta$ for each MB, a system or method in accordance with an embodiment of the present invention may calculate the weight based on the local information, then $\eta$ is determined by $$\eta = \left(\frac{\omega_{avg}}{\omega}\right)^\epsilon \qquad (22)$$

The parameter $w_{avg}$ represents the average weight of the current frame and $\epsilon$ is set to be 0.25 in one embodiment.

In accordance with an embodiment of the present invention, the Lagrange parameter should be determined before coding the current frame in order to perform RDO. However, the parameters $\Lambda_i$, $\hat{S}$, $\Lambda$, $w_{avg}$ and $v_g$ can only be calculated after coding the current frame. Therefore, a system or method in accordance with an embodiment of the present invention may estimate them by averaging their three previous values from the frames coded in the same manner, such as, $$\hat{\Lambda}_i^j = \frac{1}{3}\sum_{n=1}^{3} \Lambda_i^{j-n} \qquad (23)$$

where the j indicates the frame number. The global motion vector, $v_g$, is derived using maximum likelihood estimation which finds the peak of the motion vector histogram.

To encode the first few frames, the adaptive Lagrange parameter selection method is not used since it is difficult to estimate $\Lambda_i$, $\hat{S}$, $\Lambda$, $w_{avg}$ and $v_g$. Based on the high rate $\lambda$ selection method, a system or method in accordance with an embodiment of the present invention may derive a Lagrange parameter based on the high bit rate assumption for such a situation, for which the SSIM index in the DCT domain may be approximated by $$E[SSIM(x,y)] \approx \left\{1 - E[X(0) - Y(0)]^2 \times E\left[\frac{1}{2X(0)^2 + N \cdot C_1}\right]\right\} \times \left\{1 - E\left[\sum_{k=1}^{N-1}(X(k) - Y(k))^2\right] \times E\left[\frac{1}{2\sum_{k=1}^{N-1} X(k)^2 + N \cdot C_2}\right]\right\} \qquad (24)$$

If the high rate assumption is valid, the source probability distribution may be approximated as uniform distribution and the MSE can be modeled by $$D = s \cdot Q^2 \qquad (25)$$

The Lagrange parameter based on the high rate assumption rate and MSE models is then given by $$\lambda_{HR} = -\frac{dD}{dR} = c \cdot Q^2 \qquad (26)$$

where c is a constant. The general form of $\lambda_{HR}$ can be derived by calculating the derivative of SSIM with respect to R, which leads to $$\lambda_{HR} = a \cdot Q^2 - b \cdot Q^4 \qquad (27)$$

In accordance with an embodiment of the present invention, the values for a and b may be determined empirically by experimenting with SSIM and the rate models:

$$a = \begin{cases} 2.1 \times 10^{-4} & B \text{ frame} \\ 7 \times 10^{-5} & \text{otherwise} \end{cases} \qquad (28)$$

$$b = \begin{cases} 1.5 \times 10^{-9} & B \text{ frame} \\ 5 \times 10^{-10} & \text{Otherwise} \end{cases}$$

In the rate model in accordance with an embodiment of the present invention (15), the modeling of side information may be totally based on the source rate. In an extreme situation, for example, such as if the source rate is zero, the rate model will fail because the header bit cannot be zero in the real video coding scenario. Therefore, a system or method in accordance with an embodiment of the present invention may include an escape means to keep a reasonable performance, where the Lagrange parameter is given by $$\lambda = \begin{cases} \lambda_{HR} & H = 0 \\ \dfrac{\dfrac{dSSIM}{dQ}}{\dfrac{dR}{dQ}} & \text{otherwise} \end{cases} \quad (29)$$

FIG. 7 is a diagram summarizing the overall framework of an embodiment of the present invention for RDO for IPP GOP structure in video encoding. A skilled reader will recognize that FIG. 7 is one possible example of an RDO scheme utilized in an embodiment of the present invention. Specifically, FIG. 7 is based upon a GOP structure: IPP. A similar process may be applied to IBP as well. A skilled reader will recognize that other RDO schemes or models that may be based in other structures are possible as embodiments of the present invention.

The overhead complexities introduced by the method in FIG. 7 are only moderate. The additional computations may include the DCT transform of the original frame, the calculation of the parameters $\Lambda_i$, $\hat{S}$, $\Lambda$, $w_{avg}$, and $v_g$, and the calculation of SSIM for each coding mode.

In one aspect of the present invention, a multi-pass GOP based quantization parameter (QP) adjustment scheme may be utilized for video coding. One embodiment of the present invention may utilize a distortion model such that the distortion level is calculated by weighted sum of GOP-level frame-average SSIM values where more weights may be given to the GOPs with lower frame-average SSIM values. More specifically, a multi-pass method may be used to divide the video sequence into multiple GOPs based on quality/distortion level. If a total of n passes are used, the first n−1 passes may be used to draw a quality/distortion curve based on SSIM-index and divide the video sequence into GOPs such that all the frames in a GOP have similar quality/SSIM value. The GOPs maybe ranked in ascending order based on the average SSIM values of all frames in individual GOPs. Subsequently, the quantization parameter (QP) of each GOP is adjusted based on the distortion model so as to closely approach a target distortion level. One embodiment of the presentation invention may utilize a distortion model that corresponds to the extreme case where all weights are given to the GOP with the lowest frame-average SSIM value, and thus the overall quality of the video is determined by the lowest quality GOP.

In another aspect of the present invention, a single-pass frame level quantization parameter (QP) adjustment may be utilized for video coding. One embodiment of the present invention maintain a pre-specified quality level/SSIM value over frames throughout the video sequence by adjusting the QP level of each frame according to an SSIM estimation method such as the one defined by (12). Another embodiment of the present invention maintain a pre-specified quality level/SSIM value over frames throughout the video sequence by adjusting the QP level of each frame according to the difference between the target quality level/SSIM value and the SSIM value of the previous frame. In particular, if the quality level/SSIM value of the previous frame is lower than the target, The QP value is decreases and vice versa.

Examples of Implementations and Results

The examples described herein are provided merely to exemplify possible embodiments of the present invention. A skilled reader will recognize that various other embodiments of the present invention are also possible.

Implementation trials and tests have shown that various embodiments of the present invention can achieve 2% to 35% rate reduction as compared to prior art uses of an MPEG/H.264 AVC JM15.1 encoder. The rate reduction achieved by various embodiments of the present invention may depend on the nature of the video signal being coded. The rate reduction of various embodiments of the present invention may be achieved while maintaining the same level of perceptual video quality as prior art uses of an MPEG/H.264 AVC JM15.1 encoder. The level of perceptual video quality of various embodiments of the present invention has been verified by both objective SSIM quality measure and subjective experiments. The increase of the computational complexity has been shown to be approximately 6% at the encoder and 0% at the decoder.

To validate the accuracy and efficiency of the perceptual RDO scheme of an embodiment of the present invention, the mode selection scheme in accordance with an embodiment of the present invention was integrated into the MPEG4/H.264 AVC reference software JM15.1. All test video sequences were in YCbCr 4:2:0 format. The common coding configurations were set as follows: all available inter and intra modes are enabled; five reference frames; one I frames followed by all inter frames; high complexity RDO and the fixed quantization parameters are set from 28 to 40. Two experiments were used to validate various aspects of the perceptual RDO method and other calculations according to an embodiment of the present invention. One experiment was carried out to verify the RR SSIM estimation model in accordance with an embodiment of the present invention by comparing estimated SSIM values with actual SSIM values. Another experiment was conducted to evaluate the performance of the perceptual RDO method in accordance with an embodiment of the present invention and compared with the performance of the prior art RDO scheme.

To verify the RR-SSIM estimation model of an embodiment of the present invention, the estimated (RR) SSIM and the actual values of the SSIM index for different sequences were compared with a set of various QP values. The first frame is I-frame while all the rest are inter-coded frames. Equation (12) suggests that first the parameters α and β which vary across different video content should be calculated. Thus, for each frame, the slope is calculated with the help of two points. ($\hat{S}$, $M_{RR}$) and (1,1), where the point ($\hat{S}$, $M_{RR}$) is obtained by setting QP=40, the middle point among the quantization steps used for testing the proposed scheme. Once α and β are determined, a system or method in accordance with an embodiment of the present invention can use (12) to estimate SSIM for other QP values.

Figure 8:
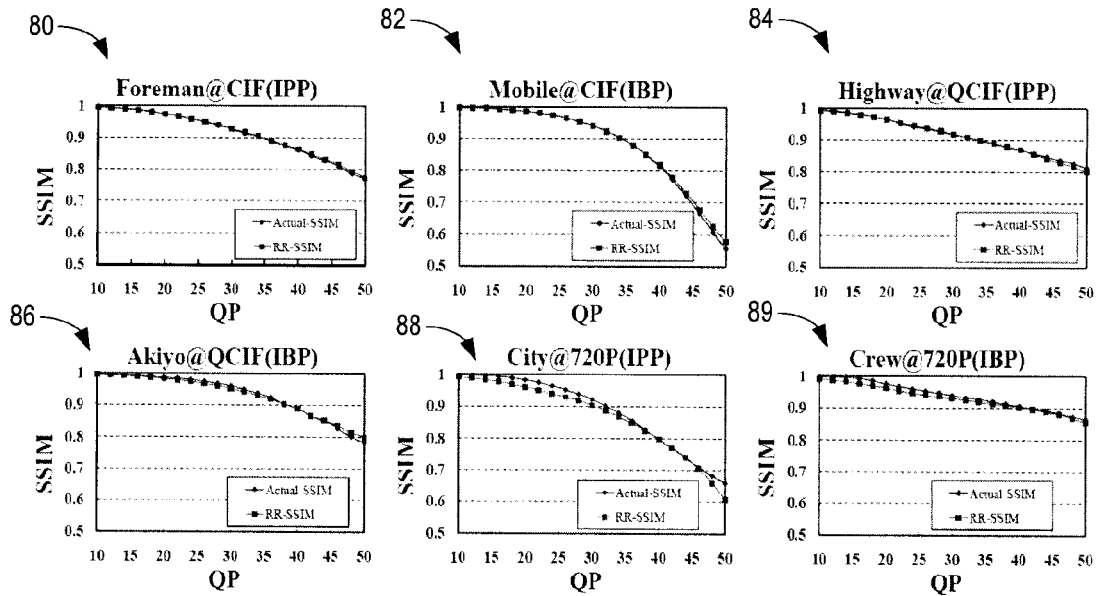
FIG. 8 is a set of graphs comparing the true SSIM and estimated RR-SSIM values.

FIG. 8 is a set of graphs comparing the true SSIM and estimated RR-SSIM values by the present invention. The test results are for six representative standard test video sequences, which are "Foreman" sequence at CIF format and IPP GOP structure 80; "Mobile" sequence at CIF format and IBP GOP structure 82; "Highway" sequence at QCIF format and IPP GOP structure 84; "Akiyo" sequence at QCIF format and IBP GOP structure 86; "City" sequence at 720P format and IPP GOP structure 88; and "Crew" sequence at 720P format and IBP GOP structure 89. In each sub-drawing, the horizontal axis is the QP value, and two curves are drawn that are the true SSIM and estimated RR-SSIM values for video sequences coded at different QP values. In each sub-drawings, the two curves of true SSIM and estimated RR-SSIM generally overlap with each other, indicating that the present invention provides accurate and robust estimation of SSIM for different video contents, with different spatial resolutions, and at different compression levels. The SSIM model in accordance with an embodiment of the present invention is shown in the tables to be robust and accurate for different video contents with different resolutions. Moreover, the Pearson Linear Correlation Coefficient (PLCC) and Mean Absolute Error (MAE) between SSIM and RR-SSIM which are given in Table A, below, for ten different sequences were calculated. The values suggest that the RR-SSIM model in accordance with an embodiment of the present invention achieves high accuracy for different sequences across a wide range of quality levels.

TABLE A

MAE AND PLCC BETWEEN FR-SSIM AND RR-SSIM ESTIMATION FOR DIFFERENT SEQUENCES

| Sequences | GOP Structure | PLCC | MAE |
|---|---|---|---|
| Foreman(CIF) | IPP | 0.999 | 0.002 |
| News(CIF) | IPP | 0.999 | 0.002 |
| Mobile(CIF) | IBP | 0.999 | 0.004 |
| Paris(CIF) | IBP | 0.999 | 0.003 |
| Highway(QCIF) | IPP | 0.998 | 0.003 |
| Suize(QCIF) | IPP | 0.998 | 0.004 |
| Carphone(QCIF) | IBP | 0.997 | 0.006 |
| Akiyo(QCIF) | IBP | 0.998 | 0.005 |
| City(720P) | IPP | 0.994 | 0.015 |
| Crew(720P) | IBP | 0.997 | 0.009 |
| All | | 0.996 | 0.005 |

Table A shows the linear correlation coefficient and mean absolute error between true SSIM and RR-SSIM estimation. The first column shows the test video sequences that are in different resolution format; the second column shows the GOP coding structures; the third column shows the Pearson Linear Correlation Coefficient (PLCC) between true SSIM and RR-SSIM estimation; and the fourth column shows the Mean Absolute Error (MAE) between true SSIM and RR-SSIM estimation. The high PLCC and low MAE values indicate that the SSIM estimation method in accordance with an embodiment of the present invention achieves high accuracy and robustness for different video sequences across a wide range of resolution formats and quality levels.

The RD performance of the perceptual RDO method and other calculations in accordance with an embodiment of the present invention were compared with the prior art RDO with distortion measured in terms of SSIM, weighted SSIM and PSNR. The three quantities for the whole video sequence were obtained by averaging the respective values of individual frames. In this experiment, a prior art method is utilized to calculate the differences between two RD curves. Furthermore, the weighted SSIM index is defined as $$SSIM_\omega = \frac{\sum_x \sum_y \omega(x,y) SSIM(x,y)}{\sum_x \sum_y \omega(x,y)} \quad (30)$$

where $w(x, y)$ indicates the weight value for $(x, y)$ as defined in (21). The SSIM indices of Y, Cb and Cr components are combined according to (6). Since $SSIM_w$ takes the motion information into account, it is more accurate for perceptual video quality assessment.

Since all test sequences are in 4:2:0 format, the PSNR of the three components is combined according to the following equation $$PSNR = 2/3 PSNR_Y + 1/6 PSNR_{Cb} + 1/6 PSNR_{Cr} \quad (31)$$

The coding computational overhead is computed as $$\Delta T = \frac{T_{pro\_RDO} - T_{org\_RDO}}{T_{org\_RDO}} \times 100\% \quad (32)$$

where $T_{org\_RDO}$ and $T_{pro\_RDO}$ indicate the total coding time with the prior art (MPEG4/H.264 AVC JM15.1) and SSIM-based RDO schemes in accordance with an embodiment of the present invention, respectively.

To verify the efficiency of the perceptual RDO method in accordance with an embodiment of the present invention, extensive experiments were conducted on standard sequences in QCIF and CIF formats. In these experiments, RD performance of the conventional RDO coding strategy and the perceptual RDO in accordance with an embodiment of the present invention were compared. The common coding configurations are set as follows: all available inter and intra modes are enabled; five reference frames; one I frames followed by all inter frames; high complexity RDO and the fixed quantization parameters are set from 28 to 40. The results of the experiments are shown in Tables B and C, below, and the RD performances are compared in FIGS. 9, 10 and 11.

TABLE B

PERFORMANCE OF THE PROPOSED ALGORITHMS (COMPARED WITH ORIGINAL RATE-DISTORTION OPTIMIZATION TECHNIQUE) FOR QCIF SEQUENCES AT 30 FRAMES/S

| Sequence | | CABAC | | | | | CAVLC | | | | |
|---|---|---|---|---|---|---|---|---|---|---|---|
| | | ΔSSIM | ΔR* | ΔSSIM$_w$ | ΔR** | ΔPSNR | ΔSSIM | ΔR* | ΔSSIM$_w$ | ΔR** | ΔPSNR |
| Akiyo | IPP... | 0.0116 | −17.85% | 0.0142 | −19.83% | 0.21 dB | 0.0123 | −19.33% | 0.0151 | −21.09% | 0.28 dB |
| | IBP... | 0.0075 | −5.77% | 0.0100 | −8.93% | 0.03 dB | 0.0091 | −9.64% | 0.0116 | −11.17% | 0.14 dB |
| Bridge-close | IPP... | 0.0171 | −30.65% | 0.0192 | −34.20% | 0.00 dB | 0.0194 | −35.64% | 0.0228 | −41.12% | 0.04 dB |
| | IBP... | 0.0148 | −29.11% | 0.0168 | −32.77% | −0.11 dB | 0.0150 | −30.90% | 0.0177 | −35.98% | −0.11 dB |
| Highway | IPP... | 0.0108 | −21.00% | 0.0127 | −20.70% | −0.27 dB | 0.0109 | −21.78% | 0.0144 | −23.09% | −0.32 dB |
| | IBP... | 0.0043 | −7.80% | 0.0057 | −9.40% | −0.35 dB | 0.0046 | −10.91% | 0.0064 | −12.82% | −0.33 dB |
| Grandma | IPP... | 0.0188 | −23.03% | 0.0219 | −25.38% | 0.20 dB | 0.0192 | −22.70% | 0.0220 | −24.47% | 0.22 dB |
| | IBP... | 0.0158 | −19.44% | 0.0192 | −21.74% | 0.09 dB | 0.0164 | −19.68% | 0.0198 | −21.59% | 0.10 dB |
| Container | IPP... | 0.0088 | −18.06% | 0.0088 | −17.12% | 0.10 dB | 0.0091 | −17.63% | 0.0096 | −17.01% | 0.08 dB |
| | IBP... | 0.0048 | −12.30% | 0.0054 | −13.11% | −0.27 dB | 0.0055 | −11.04% | 0.0058 | −10.72% | −0.22 dB |
| Salesman | IPP... | 0.0189 | −17.72% | 0.0199 | −18.11% | 0.10 dB | 0.0200 | −18.14% | 0.0210 | −18.28% | 0.13 dB |
| | IBP... | 0.0103 | −9.44% | 0.0125 | −11.24% | −0.15 dB | 0.0101 | −9.25% | 0.0118 | −10.39% | −0.18 dB |
| News | IPP... | 0.0082 | −12.76% | 0.0098 | −11.82% | −0.10 dB | 0.0078 | −12.71% | 0.0096 | −12.96% | −0.13 dB |
| | IBP... | 0.0052 | −7.36% | 0.0071 | −8.56% | −0.27 dB | 0.0046 | −6.50% | 0.0061 | −8.21% | −0.28 dB |

TABLE B-continued

PERFORMANCE OF THE PROPOSED ALGORITHMS (COMPARED WITH ORIGINAL RATE-DISTORTION OPTIMIZATION TECHNIQUE) FOR QCIF SEQUENCES AT 30 FRAMES/S

| Sequence | | CABAC | | | | | CAVLC | | | | |
|---|---|---|---|---|---|---|---|---|---|---|---|
| | | $\Delta$SSIM | $\Delta$R* | $\Delta$SSIM$_w$ | $\Delta$R** | $\Delta$PSNR | $\Delta$SSIM | $\Delta$R* | $\Delta$SSIM$_w$ | $\Delta$R** | $\Delta$PSNR |
| Carphone | IPP... | 0.0035 | −6.29% | 0.0042 | −7.21% | −0.48 dB | 0.0034 | −5.59% | 0.0042 | −6.62% | −0.47 dB |
| | IBP... | 0.0010 | −2.45% | 0.0015 | −3.55% | −0.66 dB | 0.0010 | −2.36% | 0.0019 | −4.42% | −0.67 dB |
| Average | IPP... | 0.0122 | −18.42% | 0.0138 | −19.30% | −0.03 dB | 0.0128 | −19.19% | 0.0148 | −20.58% | −0.02 dB |
| | IBP... | 0.0080 | −11.71% | 0.0098 | −13.66% | −0.21 dB | 0.0082 | −12.54% | 0.0101 | −14.41% | −0.19 dB |

*Rate reduction while maintaining SSIM.
**Rate reduction while maintaining weighted SSIM.

Table B illustrates the performance of an embodiment of the present invention compared with MPEG4/H.264 AVC for QCIF size sequences at 30 frames/second. The coding configurations for both coding schemes are set as follows: all available inter and intra modes are enabled; five reference frames; one I frames followed by 99 inter frames; high complexity RDO and the fixed quantization parameters are set from 28 to 40. The left two columns list the standard test video sequences and the GOP structures. The comparisons are for both CABAC and CAVLC entropy coding schemes. In each case, five comparisons results are reported: 1) The improvement of SSIM value for fixed bit rate; 2) The bit rate change (in percentage) for fixed SSIM value; 3) The improvement of SSIM$_w$ value for fixed bit rate; 4) The bit rate change (in percentage) for fixed SSIMw value; and 5) The improvement of PSNR value for fixed bit rate. The last two rows show the average values of all cases over all test video sequences. In all cases, embodiments of the present invention outperform prior art MPEG4/H.264 AVC coding schemes, and the average improvement in terms of bit rate reduction (without sacrificing SSIM or SSIM$_w$ performance) is about 18-21% for IPP GOP structure and 11-15% for IBP GOP structure.

configurations for both coding schemes are set as follows: all available inter and intra modes are enabled; five reference frames; one I frames followed by all inter frames; high complexity RDO and the fixed quantization parameters are set from 28 to 40. The left two columns list the standard test video sequences and the GOP structures. The comparisons are for both CABAC and CAVLC entropy coding schemes. In each case, five comparisons results are reported: 1) The improvement of SSIM value for fixed bit rate; 2) The bit rate change (in percentage) for fixed SSIM value; 3) The improvement of SSIMw value for fixed bit rate; 4) The bit rate change (in percentage) for fixed SSIMw value; and 5) The improvement of PSNR value for fixed bit rate. The last two rows show the average values of all cases over all test video sequences. In all cases, embodiments of the present invention outperform prior art MPEG4/H.264 AVC coding schemes, and the average improvement in terms of bit rate reduction (without sacrificing SSIM or SSIM$_w$ performance) is about 11-13% for IPP GOP structure and 5-7% for IBP GOP structure.

Figure 9:
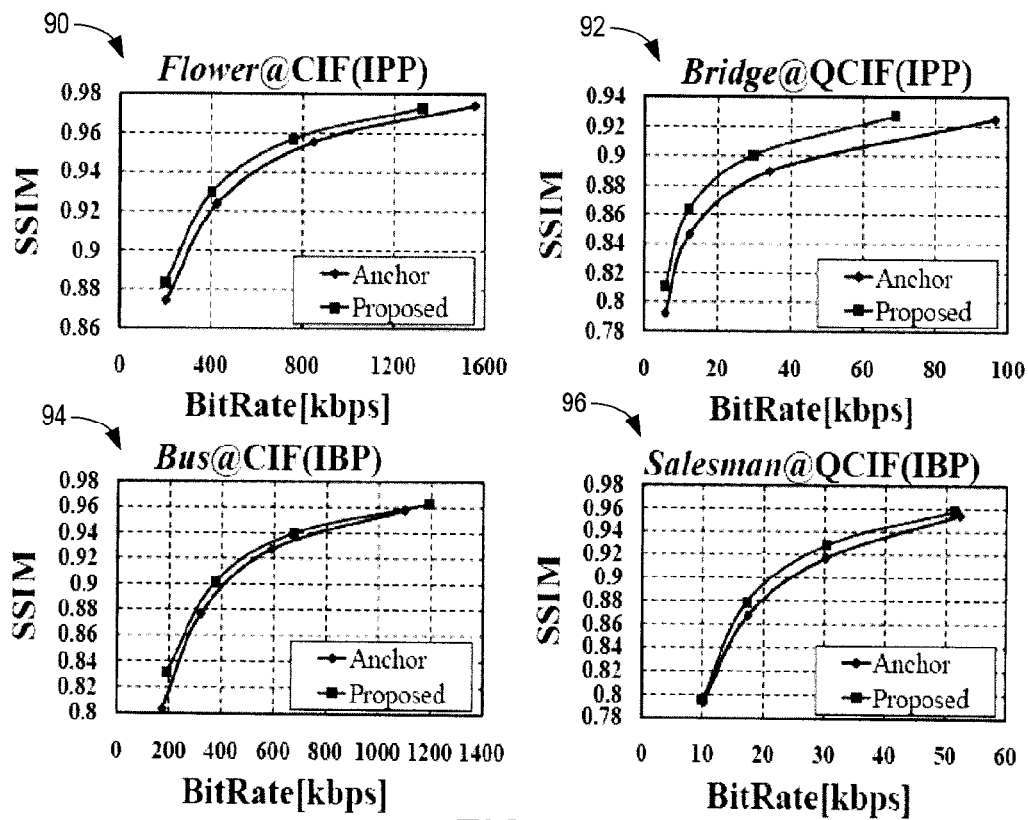
FIG. 9 is a set of graphs comparing rate-SSIM performance between MPEG4/H.264 AVC and an embodiment of the present invention with CABAC as the entropy coder.

FIG. 9 is a set of graphs comparing rate-SSIM performance between MPEG4/H.264 AVC and embodiments of the present invention with CABAC as the entropy coder.

TABLE C

PERFORMANCE OF THE PROPOSED ALGORITHMS (COMPARED WITH ORIGINAL RATE-DISTORTION OPTIMIZATION TECHNIQUE) FOR CIF SEQUENCES AT 30 FRAMES/S

| Sequence | | CABAC | | | | | CAVLC | | | | |
|---|---|---|---|---|---|---|---|---|---|---|---|
| | | $\Delta$SSIM | $\Delta$R* | $\Delta$SSIM$_w$ | $\Delta$R** | $\Delta$PSNR | $\Delta$SSIM | $\Delta$R* | $\Delta$SSIM$_w$ | $\Delta$R** | $\Delta$PSNR |
| Silent | IPP... | 0.0109 | −13.98% | 0.0118 | −14.69% | −0.16 dB | 0.0114 | −14.13% | 0.0123 | −14.85% | −0.17 dB |
| | IBP... | 0.006 | −7.79% | 0.0077 | −9.96% | −0.29 dB | 0.0063 | −7.84% | 0.0074 | −9.10% | −0.32 dB |
| Bus | IPP... | 0.0134 | −14.85% | 0.0122 | −13.88% | −0.49 dB | 0.0148 | −15.61% | 0.0136 | −14.89% | −0.51 dB |
| | IBP... | 0.0083 | −9.39% | 0.0087 | −9.51% | −0.60 dB | 0.0080 | −8.63% | 0.0081 | −8.49% | −0.66 dB |
| Mobile | IPP... | 0.0047 | −8.52% | | −10.50% | −0.43 dB | 0.0051 | −9.52% | 0.0059 | −11.76% | −0.45 dB |
| | IBP... | 0.0017 | −3.23% | 0.0026 | −5.52% | −0.53 dB | 0.0009 | −1.77% | 0.0019 | −4.35% | −0.63 dB |
| Paris | IPP... | 0.0080 | −12.07% | 0.0096 | −14.35% | −0.36 dB | 0.0076 | −11.30% | 0.0090 | −13.69% | −0.40 dB |
| | IBP... | 0.0036 | −5.17% | 0.0050 | −7.36% | −0.55 dB | 0.0029 | −4.02% | 0.0043 | −6.55% | −0.61 dB |
| Flower | IPP... | 0.0076 | −14.19% | 0.0068 | −11.69% | −0.57 dB | 0.0070 | −13.31% | 0.0063 | −10.86% | −0.69 dB |
| | IBP... | 0.0035 | −6.92% | 0.0029 | −4.65% | −0.48 dB | 0.0021 | −4.01% | 0.0014 | −1.78% | −0.66 dB |
| Foreman | IPP... | 0.0023 | −4.80% | 0.0020 | −4.26% | −0.60 dB | 0.0028 | −5.72% | 0.0027 | −5.11% | −0.55 dB |
| | IBP... | 0.0008 | −1.89% | 0.0008 | −1.97% | −0.57 dB | 0.0009 | −1.66% | 0.0008 | −1.65% | −0.59 dB |
| Tempete | IPP... | 0.0072 | −10.28% | 0.0083 | −11.70% | −0.24 dB | 0.0078 | −11.27% | 0.0088 | −12.48% | −0.24 dB |
| | IBP... | 0.0031 | −4.13% | 0.0040 | −5.51% | −0.39 dB | 0.0029 | −4.26% | 0.0038 | −5.56% | −0.43 dB |
| Waterfull | IPP... | 0.0207 | −15.51% | 0.0193 | −14.22% | −0.24 dB | 0.0237 | −17.20% | 0.0226 | −16.39% | −0.20 dB |
| | IBP... | 0.0097 | −9.37% | 0.0099 | −9.98% | −0.41 dB | 0.0092 | −8.80% | 0.0093 | −9.35% | −0.39 dB |
| Average | IPP... | 0.0094 | −11.78% | 0.0094 | −11.91% | −0.39 dB | 0.0100 | −12.26% | 0.0102 | −12.50% | −0.40 dB |
| | IBP... | 0.0046 | −5.99% | 0.0052 | −6.81% | −0.48 dB | 0.0042 | −5.12% | 0.0046 | −5.85% | −0.54 dB |

*Rate reduction while maintaining SSIM.
**Rate reduction while maintaining weighted SSIM.

Table C illustrates the performance of an embodiment of the present invention compared with MPEG4/H.264 AVC for CIF size sequences at 30 frames/second. The coding Specifically, the examples include "Flower" sequence at CIF format and IPP GOP structure 90; "Bridge" sequence at QCIF format and IPP GOP structure 92; "Bus" sequence at CIF format and IBP GOP structure 94; and "Salesman" sequence at QCIF format and IBP GOP structure 96. In each of the four examples, the horizontal axis is the bit rate in units of kbps, and the vertical axis is the SSIM values of the decoded video sequences. The "Anchor" curves show the results obtained by prior art MPEG4/H.264 AVC coding method, and the "Proposed" curves show the results achieved by an embodiment of the present invention. Between the two video coding methods being compared, in all cases, embodiments of the present invention achieve better SSIM values for the same bit rate; and in all cases, at the same SSIM level, embodiments of the present invention achieve lower bit rates.

Figure 10:
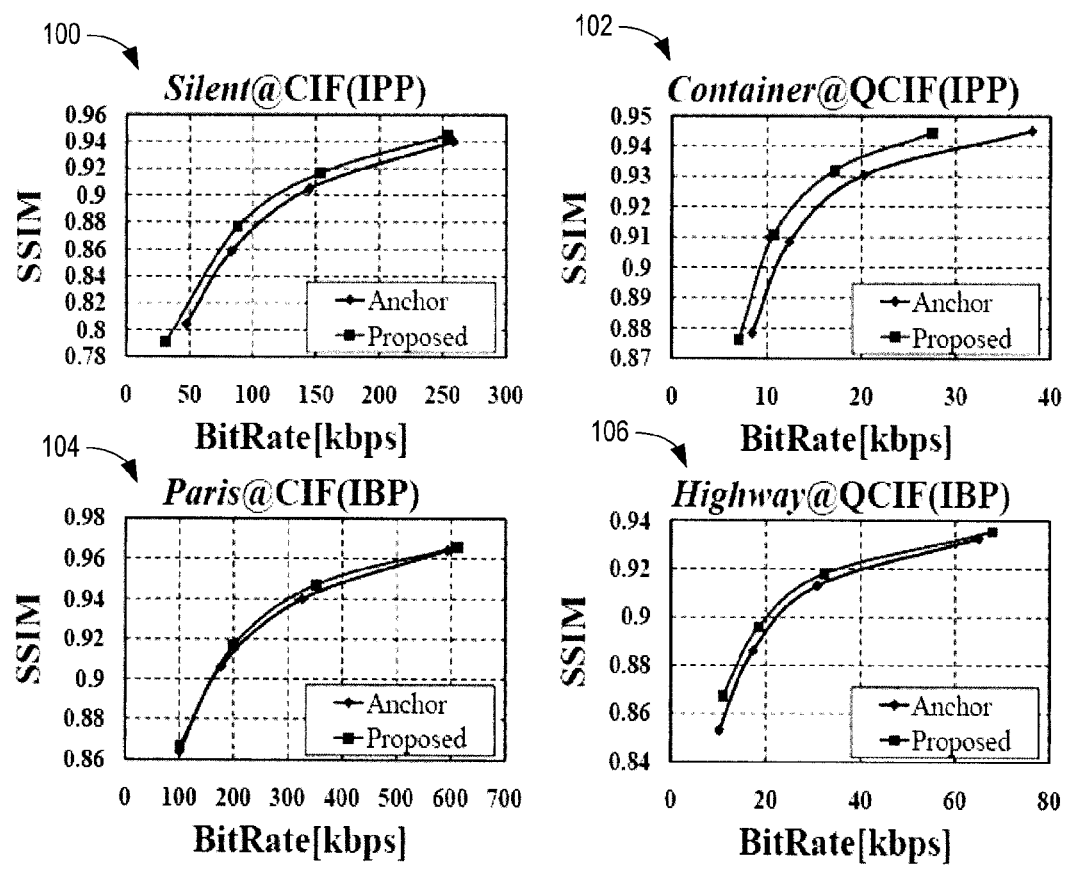
FIG. 10 is a set of graphs comparing rate-SSIM performance between MPEG4/H.264 AVC and an embodiment of the present invention with CAVLC as the entropy coder.

FIG. 10 is a set of graphs comparing rate-SSIM performance between MPEG4/H.264 AVC and embodiments of the present invention with CACLV as the entropy coder. Specifically, the examples include "Silent" sequence at CIF format and IPP GOP structure 100; "Container" sequence at QCIF format and IPP GOP structure 102; "Paris" sequence at CIF format and IBP GOP structure 104; and "Highway" sequence at QCIF format and IBP GOP structure 106. In each of the four examples, the horizontal axis is the bit rate in units of kbps, and the vertical axis is the SSIM values of the decoded video sequences. The "Anchor" curves show the results obtained by prior art MPEG4/H.264 AVC coding method, and the "Proposed" curves show the results achieved by an embodiment of the present invention. Between the two video coding methods being compared, in all cases, embodiments of the present invention achieve better SSIM values for the same bit rate; and in all cases, at the same SSIM level, embodiments of the present invention achieve lower bit rates.

Figure 11:
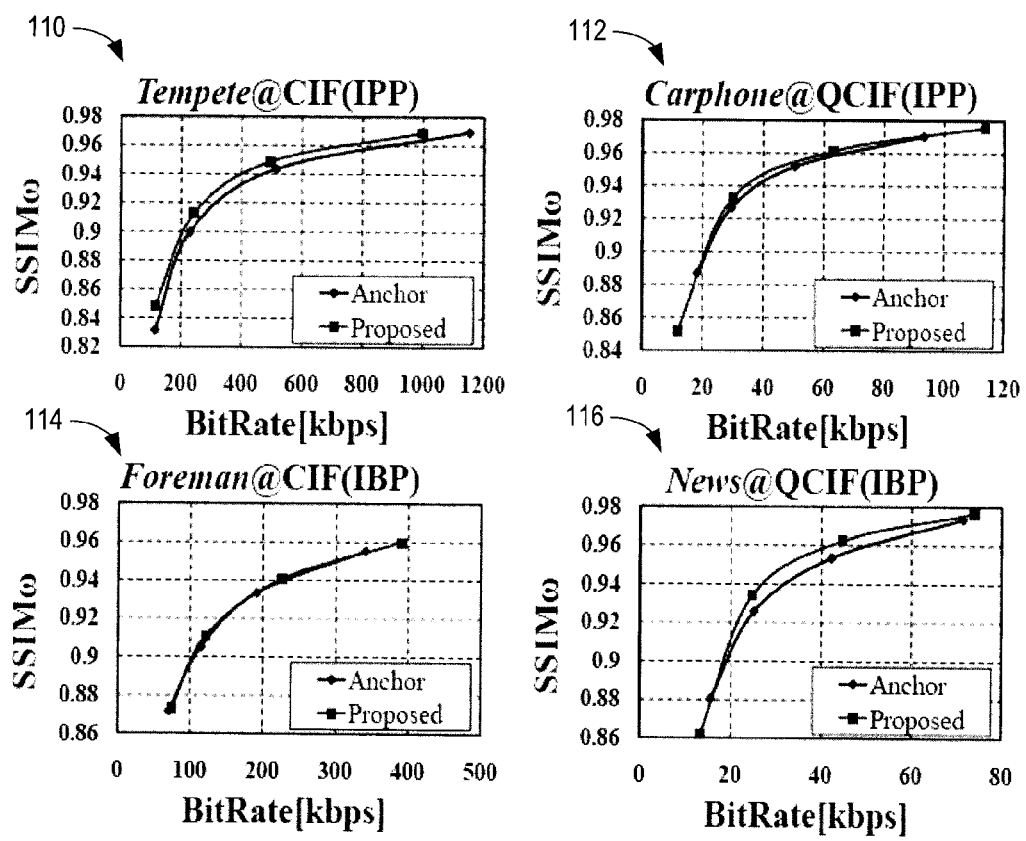
FIG. 11 is a set of graphs comparing rate-weighted SSIM performance between MPEG4/H.264 AVC and an embodiment of the present invention with CABAC as the entropy coder.

FIG. 11 is a set of graphs comparing rate-weighted SSIM performance between MPEG4/H.264 AVC and embodiments of the present invention with CABAC as the entropy coder. Specifically, the examples include "Tempete" sequence at CIF format and IPP GOP structure 110; "Carphone" sequence at QCIF format and IPP GOP structure 112; "Foreman" sequence at CIF format and IBP GOP structure 114; and "News" sequence at QCIF format and IBP GOP structure 116. In each of the four examples, the horizontal axis is the bit rate in units of kbps, and the vertical axis is the weighted-SSIM values of the decoded video sequences. The "Anchor" curves show the results obtained by prior art MPEG4/H.264 AVC coding method, and the "Proposed" curves show the results achieved by an embodiment of the present invention. Between the two video coding methods being compared, in all cases, embodiments of the present invention achieve better weighted-SSIM values for the same bit rate; and in all cases, at the same weighted-SSIM level, embodiments of the present invention achieve lower bit rates.

For IPP GOP structure, on average 15% rate reduction for fixed SSIM and 16% rate reduction while fixing weighted SSIM are achieved for both QCIF and CIF sequences. When the GOP structure is IBP, the rate reductions are 9% on average for fixed SSIM and 10% on average for fixed weighted SSIM. The lower gain of IBP coding scheme may be explained by two reasons. First, B frame is usually coded at relatively low bit rate while the scheme in accordance with an embodiment of the present invention achieves superior performance at high bit rate compared to low bit rate, as can be observed from FIG. 9. Second, the parameters estimation scheme is less accurate for this GOP structure because the frames of the same coding types are not adjacent to each other.

Rate reduction peaks for sequences with slow motion such as Bridge, in which case 35% of the bits can be saved for the same SSIM value of the received video. It is observed that for these sequences with larger Λ, the superior performance is mainly due to the selection of the MB mode with less bits. Another interesting observation is that the performance gain in accordance with an embodiment of the present invention decreases at very low bit rate, such as the Bridge and Salesman in FIG. 9. It is due to the fact that at low bit rate a large percentage of MBs have already been coded with the best mode in the prior art RDO scheme, such as SKIP mode. Also, the limitation of the rate model of an embodiment of the present invention also brings the limited performance gain at low bit rate. The performance in terms of PSNR was also compared, which is shown in Tables B and C, and in example tables Silent@CIF(IPP) 120, Paris@CIF(IPP) 122, Salesma@QCIF(IPP) 124, and News@QCIF(IPP) 126 as shown in FIG. 12.

Figure 12:
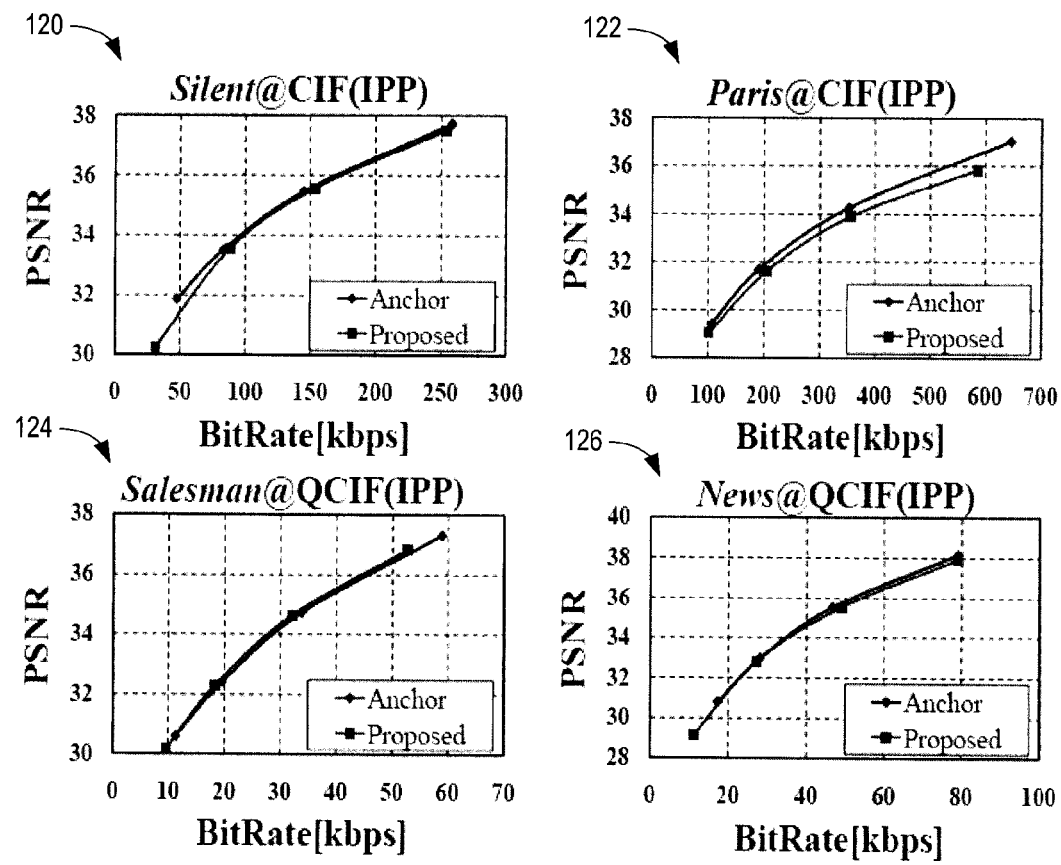
FIG. 12 is a set of graphs comparing rate-PSNR performance between MPEG4/H.264 AVC and an embodiment of the present invention with CAVLC as the entropy coder.

FIG. 12 is a set of graphs comparing rate–PSNR performance between MPEG4/H.264 AVC and embodiments of the present invention with CAVLC as the entropy coder. Specifically, the examples include "Silent" sequence at CIF format and IPP GOP structure 120; "Paris" sequence at CIF format and IPP GOP structure 122; "Salesman" sequence at QCIF format and IPP GOP structure 124; and "News" sequence at QCIF format and IPP GOP structure 126. In each of the four examples, the horizontal axis is the bit rate in units of kbps, and the vertical axis is the SSIM values of the decoded video sequences. The "Anchor" curves show the results obtained by prior art MPEG4/H.264 AVC coding method, and the "Proposed" curves show the results achieved by an embodiment of the present invention. Since the present invention aims to improve SSIM rather than PSNR, not surprisingly, it may cause both increases and decreases in PSNR values, though both increases and decreases are minor.

To show the advantage of the frame-MB joint RDO scheme in accordance with an embodiment of the present invention, the performance comparisons of the frame level perceptual RDO (FP-RDO) and the Frame-MB level perceptual RDO (FMP-RDO) are also listed in Table D, below.

TABLE D

PERFORMANCE COMPARISON OF THE PROPOSED FPRDO AND FMPRDO
CODING (ANCHOR: CONVENTIONAL RATE-DISTORTION OPTIMIZATION TECHNIQUE)

| | | CABAC | | | | CAVLC | | | |
| | | IPPPP | | IBPBP | | IPPPP | | IBPBP | |
| Sequence | | ΔR* | ΔR** | ΔR* | ΔR** | ΔR* | ΔR** | ΔR* | ΔR** |
| --- | --- | --- | --- | --- | --- | --- | --- | --- | --- |
| Flower(CIF) | FMP-RDO | −14.19% | −11.69% | −6.92% | −4.65% | −13.31% | −10.86% | −4.01% | −1.78% |
| | FP-RDO | −14.34% | −11.43% | −6.73% | −4.05% | −12.73% | −9.75% | −2.04% | 0.38% |

TABLE D-continued

PERFORMANCE COMPARISON OF THE PROPOSED FPRDO AND FMPRDO
CODING (ANCHOR: CONVENTIONAL RATE-DISTORTION OPTIMIZATION TECHNIQUE)

| | | CABAC | | | | CAVLC | | | |
| | | IPPPP | | IBPBP | | IPPPP | | IBPBP | |
| Sequence | | ΔR* | ΔR** | ΔR* | ΔR** | ΔR* | ΔR** | ΔR* | ΔR** |
| --- | --- | --- | --- | --- | --- | --- | --- | --- | --- |
| Waterfull(CIF) | FMP-RDO | −15.51% | −14.22% | −9.37% | −9.98% | −17.20% | −16.39% | −8.80% | −9.35% |
| | FP-RDO | −15.45% | −14.43% | −8.79% | −9.47% | −16.13% | −15.48% | −7.98% | −8.62% |
| Bus(CIF) | FMP-RDO | −14.85% | −13.88% | −9.39% | −9.51% | −15.61% | −14.89% | −8.63% | −8.49% |
| | FP-RDO | −14.71% | −13.72% | −8.95% | −8.84% | −16.05% | −14.96% | −8.72% | −8.63% |
| Silent(CIF) | FMP-RDO | −13.98% | −14.69% | −7.79% | −9.96% | −14.13% | −14.85% | −7.84% | −9.10% |
| | FP-RDO | −14.62% | −15.28% | −8.07% | −9.79% | −15.23% | −15.59% | −8.53% | −9.85% |
| Salesman(QCIF) | FMP-RDO | −17.72% | −18.11% | −9.44% | −11.24% | −18.14% | −18.28% | −9.25% | −10.39% |
| | FP-RDO | −17.09% | −17.48% | −8.44% | −10.43% | −18.17% | −19.06% | −8.28% | −9.75% |
| Carphone(QCIF) | FMP-RDO | −6.29% | −7.21% | −2.45% | −3.55% | −5.59% | −6.62% | −2.36% | −4.42% |
| | FP-RDO | −6.89% | −7.31% | −2.11% | −3.43% | −4.40% | −5.86% | −2.61% | −4.85% |
| Container(QCIF) | FMP-RDO | −18.06% | −17.12% | −12.30% | −13.11% | −17.63% | −17.01% | −11.04% | −10.72% |
| | FP-RDO | −17.23% | −16.21% | −12.41% | −13.16% | −18.20% | −17.90% | −11.89% | −11.71% |
| Bridge(QCIF) | FMP-RDO | −30.65% | −34.20% | −29.11% | −32.77% | −35.64% | −41.12% | −30.90% | −35.98% |
| | FP-RDO | −30.93% | −34.24% | −30.16% | −33.88% | −33.78% | −39.32% | −30.40% | −35.48% |

*Rate reduction while maintaining of SSIM.
**Rate reduction while maintaining weighted SSIM.

Table D illustrates performance comparisons of the frame level perceptual RDO (FP-RDO) and the Frame-MB level perceptual RDO (FMP-RDO) coding schemes. The first column lists the test video sequences and their resolution format. The second column shows the RDO schemes. The comparisons include the cases of both CABAC and CAVLC entropy coding. In each case, four comparisons results are reported, which are 1) The bit rate change (in percentage) as compared to MPEG4/H.264 AVC at fixed SSIM value for IPPPP GOP structure; 2) The bit rate change (in percentage) as compared to MPEG4/H.264 AVC at fixed weighted-SSIM value for IPPPP GOP structure; 3) The bit rate change (in percentage) as compared to MPEG4/H.264 AVC at fixed SSIM value for IBPBP GOP structure; and 4) The bit rate change (in percentage) as compared to MPEG4/H.264=/AVC at fixed weighted-SSIM value for IBPBP GOP structure. This table illustrates that MB-level RDO tuning may or may not lead to further improvement in terms of bit rate saving upon frame level RDO, which an object of the present invention.

It can be observed that the weighted SSIM increases for sequences with high motion, such as Flower and Bus. However, the weighted SSIM decreases for constant sequences, such as Silent. This performance degradation mainly comes from the inter prediction technique used in video coding. For instance, the MB with higher weight in the current frame may get the prediction pixels from an unimportant MB in the previous frame, which can cause more quantization errors. In an embodiment, a system or method in accordance with the present invention focuses on RDO frame by frame.

Figure 13:
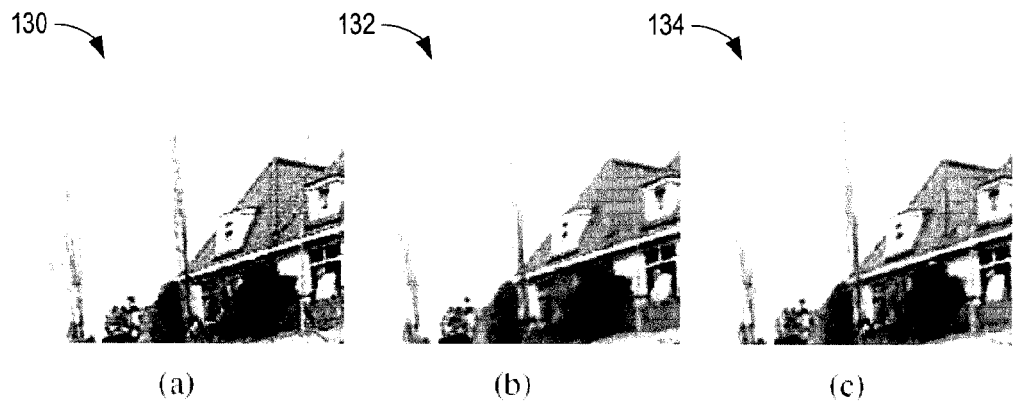
FIG. 13 is a set pictures demonstrating the visual performance of an embodiment of the present invention and MPEG4/H.264 AVC. (a) original frame; (b) MPEG4/H.264 AVC coded; (c) present invention.

FIG. 13 is a set of pictures demonstrating the visual performance of embodiments of the present invention and MPEG4/H.264 AVC. (a) shows the original frame 130; (b) shows MPEG4/H.264 AVC coded frame 132; and (c) shows the coded frame by an embodiment of the present invention 134. The bit rates for the two coding methods are almost the same. However, since the RDO scheme of an embodiment of the present invention is based on SSIM index optimization, higher SSIM value is achieved. Furthermore, the visual quality of the reconstructed frame has been improved by embodiments of the present invention. Specifically, more information and details have been preserved, such as the branches on the roof. The visual quality improvement is due to the fact that the best mode may be selected from perceptual point of view, resulting in more bits allocated to the areas that are more sensitive to our visual systems.

Figure 14:
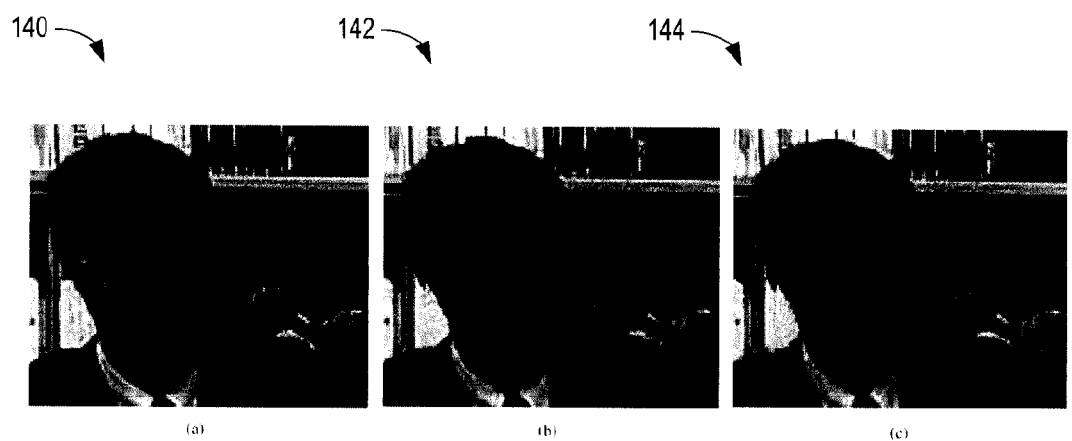
FIG. 14 shows the visual performance of the FP-RDO and the FMP-RDO in the low bit rate video coding environment. (a) shows an original thirty fifth frame of the Paris sequence; (b) shows the thirty fifth frame of the Paris sequence that is MPEG4/H.264 AVC coded with FP-RDO; and (c) shows the thirty fifth frame of the Paris sequence that is MPEG4/H.264 AVC coded with FMP-RDO.

FIG. 14 shows the visual performance of the FP-RDO and the FMP-RDO in the low bit rate video coding environment. Example picture (a) 140 shows an original thirty fifth frame of the Paris sequence, that is cropped for visualization; example picture (b) 142 shows the thirty fifth frame of the Paris sequence that is MPEG4/H.264 AVC coded with FP-RDO at a bit rate of 101.5 kbit/s, SSIM of 0.8667 and PSNR at 29.16 dB; and example picture (c) 144 shows the thirty fifth frame of the Paris sequence that is MPEG4/H.264 AVC coded with FMP-RDO at a bit rate of 102.5 kbit/s, SSIM at 0.8690, and PSNR at 29.33 dB. The bit rate of FMP-RDO is 102.5 kbit/s while that of FPRDO is 101.5 kbit/s. For FMP-RDO, the moving objects are allocated more bits, such as the face of the man; while the background MBs are allocated less bits. Therefore, the quality of the moving regions which attract more attention in the whole frame is improved.

To further validate the scheme in accordance with an embodiment of the present invention, a subjective quality evaluation test was conducted based on the human two-alternative-forced-choice (2AFC) method. The 2AFC method is regarded as a direct method for model comparison where each subject is stimulated by a pair of stimulations and forced to choose a better one. In this case, eight pairs of sequences were selected with CIF format which are coded by the prior art scheme and the RDO scheme in accordance with an embodiment of the present invention with the same SSIM level. Each pair is repeated six times with randomly selected order. As a result 48 pairs of 8 video sequences were obtained. Every subject was asked to select the video with better quality as compared to the other one. Ten subjects participated in this experiment. Table E lists all the testing sequences as well as their SSIM indices and bit rates.

TABLE E

SSIM INDICES AND BIT RATE OF TESTING SEQUENCES

| | | Conventional RDO | | Proposed RDO | |
|---|---|---|---|---|---|
| | Sequences | SSIM | Bit rate | SSIM | Bit rate |
| 1 | Bus | 0.996 | 6032.68 kbit/s | 0.9955 | 5807.44 kbit/s |
| 2 | Hall | 0.9899 | 4976.36 kbit/s | 0.99 | 4745.04 kbit/s |
| 3 | Container | 0.9745 | 994.04 kbit/s | 0.9754 | 883.72 kbit/s |
| 4 | Tempete | 0.9726 | 1248.4 kbit/s | 0.9707 | 1044.72 kbit/s |
| 5 | Akiyo | 0.9711 | 97.81 kbit/s | 0.9722 | 75.68 kbit/s |
| 6 | Silent | 0.9655 | 457.68 kbit/s | 0.9669 | 423.02 kbit/s |
| 7 | Mobile | 0.9577 | 728.87 kbit/s | 0.9572 | 703.34 kbit/s |
| 8 | Stefan | 0.8956 | 179.42 kbit/s | 0.8973 | 174.33 kbit/s |

Table E shows SSIM values and the data rates of the video sequences used in the subjective experiment, which is used to further validate the coding scheme of an embodiment of the present invention. The subjective test is based on the two-alternative-forced-choice (2AFC) method, which is regarded as a direct method for model comparison where each subject is stimulated by a pair of stimulations and forced to choose a better one. In this subjective experiment, eight pairs of sequences were selected with CIF format which are coded by the prior art MPEG4/H.264 AVC scheme (denoted by "Conventional RDO") and the RDO scheme of an embodiment of the present invention (denoted by "Proposed RDO") to achieve the same SSIM level. Each pair is repeated six times with randomly selected order. As a result, 48 pairs of 8 video sequences were obtained. Every subject was asked to select the video with better quality as compared to the other one. Ten subjects participated in this experiment. The current table lists all the testing sequences as well as their SSIM indices and bit rates.

Three variables were defined to describe the results of this test. The first one, $\bar{\omega}$, represents the percentage by which the conventional RDO scheme based video is selected by the subjects as the one with better quality. It may be expected that the value of $\bar{\omega}$ will be close to 50% as both videos in a pair has nearly the same SSIM index value. The other two are the standard deviation values calculated based on each subject, $\sigma_{sb}$, and each sequence $\sigma_{sq}$. The error-bars for each sequence and each subject are shown in FIGS. 15 and 16, respectively, when averaged over all subjects and sequences, the value of $\bar{\omega}$ is 52.5%, which is quite close to anticipated value of 50% and therefore indicates that the visual quality of videos with the same SSIM level can be approximated to be the same in the application of video coding.

Figure 15:
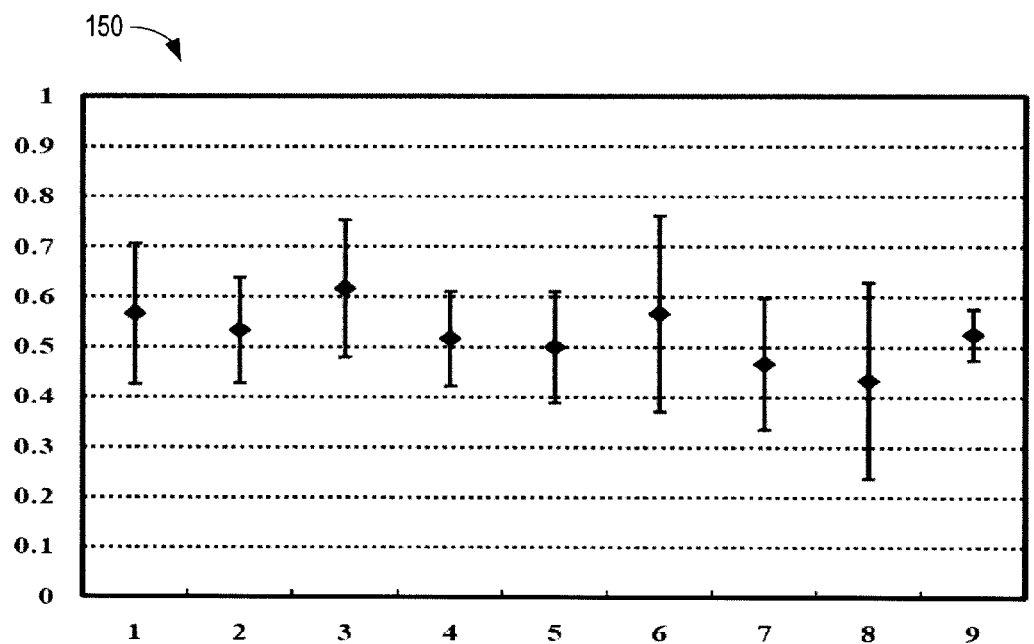
FIG. 15 is a graph illustrating the subjective visual quality experiments for different test video sequence.

FIG. 15 is a graph illustrating the subjective visual quality experiments for different test video sequence. Each pair of test sequences were evaluated by multiple subjects based on 2AFC experiment, and the mean and standard deviation across all subjects were computed for each test sequence. The pairs of test video sequences were coded by MPEG4/H.264 AVC and by an embodiment of the present invention to achieve approximately the same SSIM value (but with lower bit rate). A table that includes multiple error bars plotted for each test sequence is shown 150. It can be observed that the center of each error bar is close to 50%, with generally narrow width of the bar that covers the 50% line. This indicates that subjects do not make distinctions on the quality of the pair of video sequences, though the sequence in each pair that was coded by an embodiment of the present invention has a lower bit rate.

Figure 16:
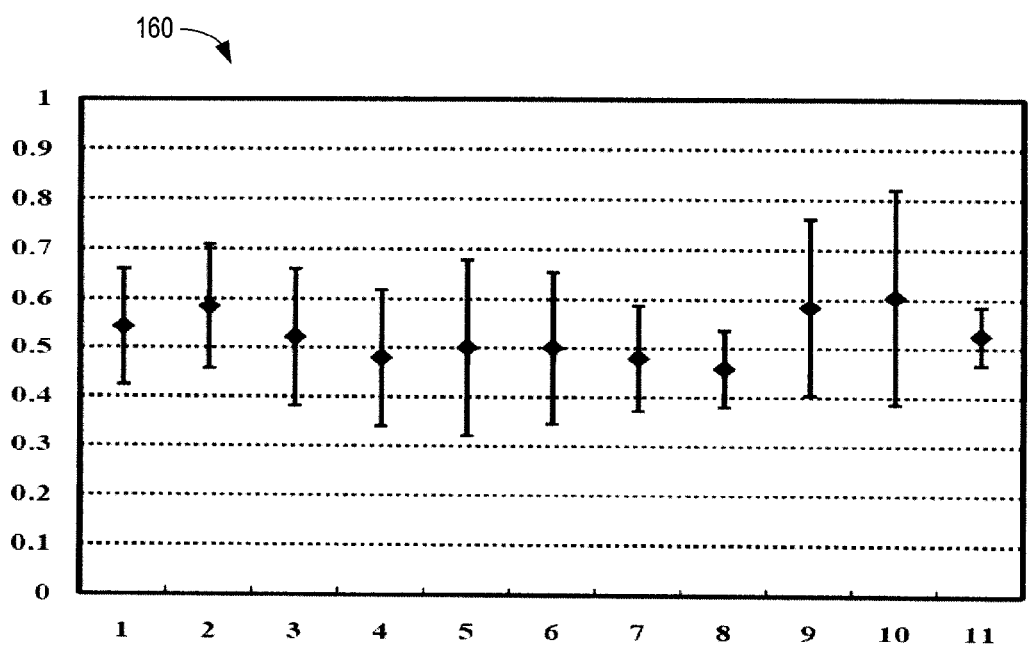
FIG. 16 is a graph illustrating the subjective visual quality experiments for different subject.

FIG. 16 is a graph illustrating the subjective visual quality experiments for different subject. Each pair of test sequences were evaluated by multiple subjects based on 2AFC experiment, and the mean and standard deviation across all test sequences were computed for each subject. The pairs of test video sequences were coded by MPEG4/H.264 AVC and by an embodiment of the present invention to achieve approximately the same SSIM value (but with lower bit rate). A table that includes multiple error bars plotted for each subject is shown 150. It can be observed that the center of each error bar is close to 50%, with generally narrow width of the bar that covers the 50% line. This indicates that subjects do not make distinctions on the quality of the pair of video sequences, though the sequence in each pair that was coded by an embodiment of the present invention has a lower bit rate.

The error bars plotted in FIGS. 15 and 16 reveal that the testing results for embodiments of the present invention are robust to different sequences and subjects. This demonstrates that using the schemes of various embodiments of the present invention may achieve significant rate reduction while maintaining the same level of perceptual image quality.

Implementation trials have shown that an embodiment of the present invention that relates to a multi-pass GOP based parameter adjustment scheme may achieve approximately 30% rate reduction on average as compared to prior art use of an MPEG4/H.264 AVC JM15.1 encoder. An embodiment of the present invention that related to a multi-pass GOP based parameter adjustment along with rate-SSIM optimization scheme may achieve approximately 42% rate reduction on average as compared to the prior art use of an MPEG/H.264 AVC JM15.1 encoder.

TABLE F

ENCODING COMPLEXITY OVERHEAD OF THE PROPOSED SCHEME

| Sequences | ΔT with CABAC | ΔT with CAVLC |
|---|---|---|
| Akiyo(QCIF) | 5.21% | 5.72% |
| News(QCIF) | 5.18% | 5.60% |
| Mobile(QCIF) | 5.82% | 6.14% |
| Silent(CIF) | 7.04% | 7.46% |
| Foreman(CIF) | 6.79% | 7.03% |
| Tempete(CIF) | 7.04% | 7.13% |
| Average | 6.18% | 6.51% |

Table F summarizes the computational overhead at both encoder and decoder of an embodiment of the present invention over MPEG4/H.264 AVC for both CABAC and CAVLC entropy coding methods, where ΔT is calculated according to (32). The coding time is obtained by encoding 100 frames of IPPP GOP structure with Intel 2.83 GHz Core processor and 4 GB random access memory. On average the computation overhead is 6.3% for the scheme of the current embodiment of the present invention. The computation of SSIM index in mode selection process will cause about 5% overhead. Therefore, in this embodiment of the present invention, the computation overhead is mainly due to the calculation of the SSIM index for each mode. The overhead is stable for different video sequences. Since the RDO scheme in accordance with an embodiment of the present invention is only applied to the encoder, there is no overhead at the decoder side.

Figure 17:
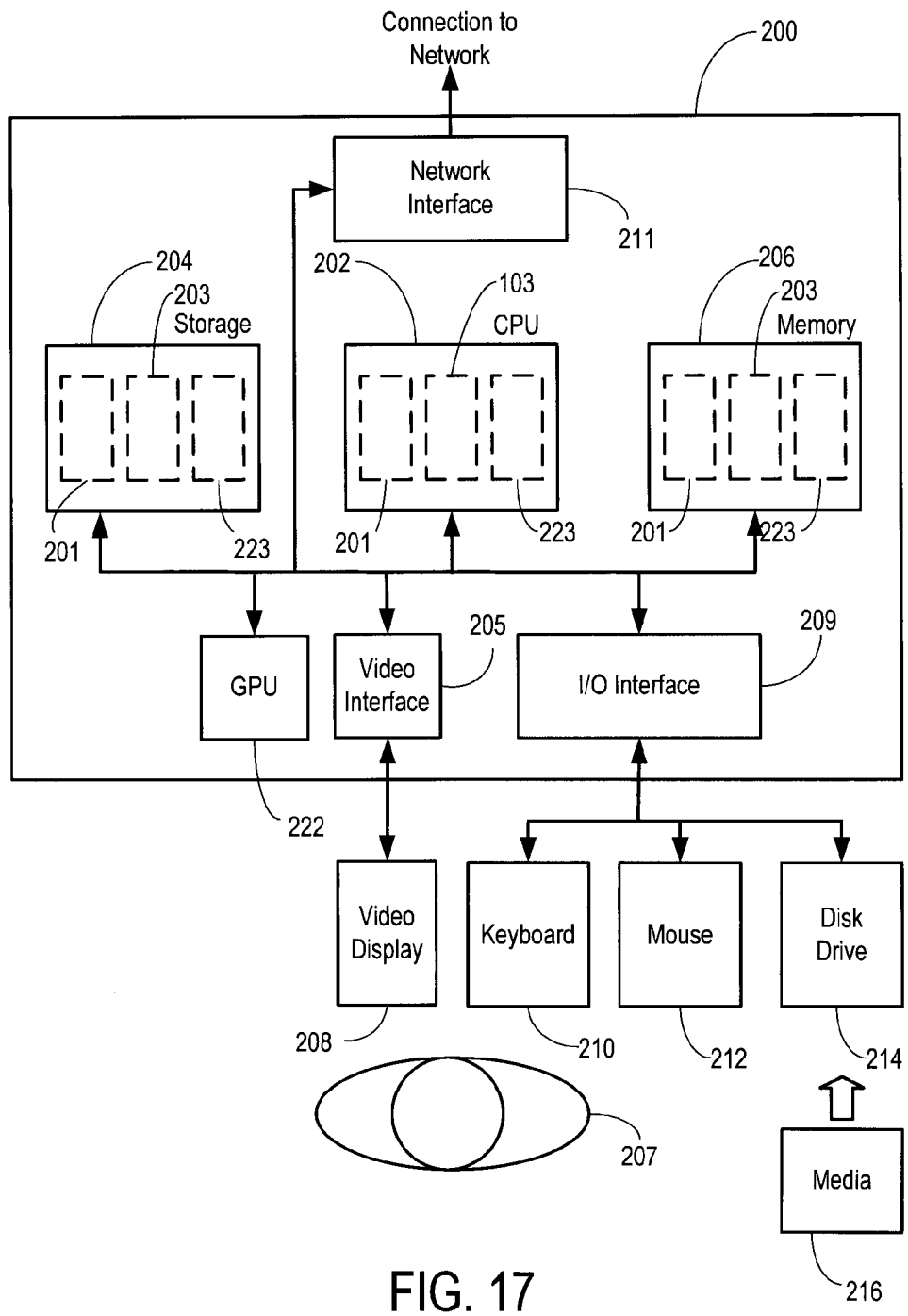
FIG. 17 is a generic computer device that may provide a suitable operating environment for practising various embodiments of the invention.

The systems and methods in accordance with the present invention may be practiced in various embodiments. A suitably configured computer device, and associated communications networks, devices, software and firmware may provide a platform for enabling one or more embodiments as described above. By way of example, FIG. 17 shows a generic computer device 200 that may include a central processing unit ("CPU") 202 connected to a storage unit 204 and to a random access memory 206. The CPU 202 may process an operating system 201, application program 203, and data 223. The operating system 201, application program 203, and data 223 may be stored in storage unit 204 and loaded into memory 206, as may be required. Computer device 200 may further include a graphics processing unit (GPU) 222 which is operatively connected to CPU 202 and to memory 206 to offload intensive image processing calculations from CPU 202 and run these calculations in parallel with CPU 202. An operator 207 may interact with the computer device 200 using a video display 208 connected by a video interface 205, and various input/output devices such as a keyboard 210, mouse 212, and disk drive or solid state drive 214 connected by an I/O interface 209. In known manner, the mouse 212 may be configured to control movement of a cursor in the video display 208, and to operate various graphical user interface (GUI) controls appearing in the video display 208 with a mouse button. The disk drive or solid state drive 214 may be configured to accept computer readable media 216. The computer device 200 may form part of a network via a network interface 211, allowing the computer device 200 to communicate with other suitably configured data processing systems (not shown).

The systems and methods in accordance with various embodiments of the present invention may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. It is understood that the terms computer-readable medium or computer useable medium comprises one or more of any type of physical embodiment of the program code. In particular, the non-transitory computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

It will be appreciated by those skilled in the art that other variations of the embodiments described herein may also be practiced without departing from the scope of the invention. Other modifications are therefore possible. For example, the embodiments of the present invention may be utilized by 3D TV, medical imaging, and telemedicine devices, as well as service providers for any of these technologies.

Examples of Application Scenarios

The present invention may generally be utilized for the storage and transmission of digital video signals. It may be implemented on both software and hardware platforms as explained further below.

A skilled reader will recognize that the present invention may be applied in various digital video applications. For example, the present invention may be utilized by manufacturers and service providers of smartphone, videoconferencing, HDTV™, IPTV™, Web TV™, network video-on-demand, DVD, digital cinema, etc. technologies and devices. For example, smartphone companies, such as RIM™, Apple™, Samsung™, HTC™, Huawei™, or other smartphone companies, may utilize the present invention to improve video transmission to smartphones, including between smartphone users. The present invention may be utilized to develop videoconferencing applications wherein the bandwidth cost could be significantly reduced without losing perceived video quality; or the video quality could be significantly improved with the same bandwidth cost. As another example, network video providers, such as Youtube™, or other network video providers, may utilize the present invention to improve the quality of the video being delivered to consumers; and/or to reduce the traffic of their network servers. As yet another example, current video quality of HDTV is often impaired by current commercial compression systems when the bandwidth is limited (especially when the video contains significant motion), and thus HDTV service providers may improve the HD video quality delivered to their customers by adopting the present invention. As yet another example, digital cinema technology companies, such as IMAX™, may use the present invention to improve the quality of the high resolution digital movie video content or to reduce the traffic burden of digital cinema network (wired or wireless) services.

Network video service providers who require video transcoding, that converts digital video from one format to another, may also make use of the present invention. When a video signal is received, it may be re-encoded by the present invention to deliver better visual quality. The present invention may be implemented as a network component, or may be embodied in a network component with other functions in order to apply the video coding function described herein.

An embodiment of the present invention that incorporates a software package, such as, for example a computer program product, may be operable to allow consumers to burn more digital content with the same storage space on their computer harddrives, DVDs, flash drives, and other portable and/or importable storage devices.

Another embodiment of the present invention may be extended to scalable video coding framework where the RDO schemes may be designed from base or lower quality layers and extrapolated to higher quality layers.

Additionally, the present invention may be directly extended to 3D video for the purposes of stereo and multi-view video compression, as well as 3D volume data compression.

Thus, in an aspect, there is provided a computer-implemented method of video coding with rate-distortion optimization, comprising: utilizing a structural similarity (SSIM) based distortion function defined to be monotonically decreasing with a SSIM based quality measure; minimizing a joint cost function defined as the sum of a data rate term and the SSIM based distortion function; and utilizing a Lagrange parameter to control the trade-off between the data rate and distortion.

In an embodiment, the method further comprises finding an optimal Lagrange parameter to control the trade-off between the data rate and distortion based on a ratio between a derivative of a SSIM based distortion function with respect to a quantization step Q and the derivative of a data rate model R with respect to the quantization step Q; utilizing a frame-level prediction model to estimate the derivative of the SSIM based distortion function with respect to the quantization step Q; and utilizing the data rate model R to estimate the derivative of the data rate with respect to quantization step Q.

In another embodiment, the method further comprises: estimating a mean squared error between original and distorted frames based on a given quantization step and a prior statistical model of transform coefficients; and utilizing the variance statistics of both DC and AC components in the original frame as normalization factors.

In another embodiment, the method further comprises: constructing a data rate model by utilizing an entropy model that excludes the bit rate of skipped blocks; utilizing a prior statistical model of transform coefficients; and utilizing entropy, quantization step and one or more parameters of a prior statistical model for estimating the overall rate, which includes both source and header information bits.

In another embodiment, the method further comprises adjusting a Lagrange parameter at a macroblock (MB) level utilizing at least one of estimation of motion information content and perceptual uncertainty of visual speed perception.

In another embodiment, the method further comprises adjusting a group-of-picture (GOP) level quantization parameter (QP) for multi-pass video encoding with fixed or variable lengths GOPs by: ranking all GOPs based on their average SSIM values of all frames utilizing one or multiple passes of encoding to create a curve of SSIM value versus frame number, and utilizing the curve to divide the video sequence into GOPs by grouping neighboring frames with similar SSIM values within individual GOPs; determining the overall quality by a weighted sum of GOP level SSIM values where more weights are given to the GOPs with lower SSIM averages; and adjusting the GOP level QP values based on a curve of SSIM versus frame number for each GOP, so as to achieve an optimal quality model.

In another embodiment, the method further comprises adjusting the frame-level quantization parameter (QP) for single-pass video encoding by: utilizing a pre-specified frame-level quality target defined by a SSIM based quality measure; and adjusting the QP of each frame to achieve constant frame-level SSIM quality according to the difference between the target SSIM value and the SSIM value of the previous frame, where if the target SSIM value is higher, then the QP is decreased.

In another embodiment, the method further comprises adjusting the frame-level QP adjustment for single-pass video encoding by: utilizing a pre-specified frame-level quality target defined by a SSIM based quality measure; and adjusting QP of each frame to achieve constant frame-level SSIM quality according to the frame-level SSIM prediction model.

In another aspect, there is provided a computer-implemented system for video coding with rate-distortion optimization, the system adapted to: utilize a structural similarity (SSIM) based distortion function defined to be monotonically decreasing with a SSIM based quality measure; minimize a joint cost function defined as the sum of a data rate term and the SSIM based distortion function; and utilize a Lagrange parameter to control the trade-off between the data rate and distortion.

In an embodiment, the system is further adapted to: find an optimal Lagrange parameter to control the trade-off between the data rate and distortion based on a ratio between a derivative of a SSIM based distortion function with respect to a quantization step Q and the derivative of a data rate model R with respect to the quantization step Q; utilize a frame-level prediction model to estimate the derivative of the SSIM based distortion function with respect to the quantization step Q; and utilize the data rate model R to estimate the derivative of the data rate with respect to quantization step Q.

In another embodiment, the system is further adapted to: estimate a mean squared error between original and distorted frames based on a given quantization step and a prior statistical model of transform coefficients; and utilize the variance statistics of both DC and AC components in the original frame as normalization factors.

In another embodiment, the system is further adapted to: construct a data rate model by utilizing an entropy model that excludes the bit rate of skipped blocks; utilize a prior statistical model of transform coefficients; and utilize entropy, quantization step and one or more parameters of a prior statistical model for estimating the overall rate, which includes both source and header information bits.

In another embodiment, the system is further adapted to adjust a Lagrange parameter at a macroblock (MB) level utilizing at least one of estimation of motion information content and perceptual uncertainty of visual speed perception.

In another embodiment, the system is further adapted to: adjust a group-of-picture (GOP) level quantization parameter (QP) for multi-pass video encoding with fixed or variable lengths GOPs by: ranking all GOPs based on their average SSIM values of all frames utilizing one or multiple passes of encoding to create a curve of SSIM value versus frame number, and utilizing the curve to divide the video sequence into GOPs by grouping neighboring frames with similar SSIM values within individual GOPs; determining the overall quality by a weighted sum of GOP level SSIM values where more weights are given to the GOPs with lower SSIM averages; and adjusting the GOP level QP values based on a curve of SSIM versus frame number for each GOP, so as to achieve an optimal quality model.

In another embodiment, the system is further adapted to adjust the frame-level quantization parameter (QP) for single-pass video encoding by: utilizing a pre-specified frame-level quality target defined by a SSIM based quality measure; and adjusting the QP of each frame to achieve constant frame-level SSIM quality according to the difference between the target SSIM value and the SSIM value of the previous frame, where if the target SSIM value is higher, then the QP is decreased.

In another embodiment, the system is further adapted to adjust the frame-level QP adjustment for single-pass video encoding by: utilize a pre-specified frame-level quality target defined by a SSIM based quality measure; and adjust QP of each frame to achieve constant frame-level SSIM quality according to the frame-level SSIM prediction model.

In another aspect, there is provided a non-transitory computer readable medium storing computer code that when executed on a device adapts the device to perform the methods as described above.

While a number of illustrative embodiments have been described above, it will be appreciated that various modifications may be made without departing from the scope of the invention which is defined by the following claims.

REFERENCES

Other background prior art references include:

B. Aswathappa and K. R. Rao, "Rate-distortion optimization using structural information in H.264 strictly intra-frame encoder," *South Eastern Symposium on System Theory*, pp. 367-370, 2010.

A. Brooks, X. Zhao, and T. Pappas, "Structural similarity quality metrics in a coding context: Exploring the space of realistic distortions," *IEEE Transactions on Image Processing*, vol. 17, pp. 121-132, August 2008.

S. Channappayya, A. C. Bovik, and Jr. R. W. Heathh, "Rate bounds on SSIM index of quantized images," *IEEE Trans. on Image Processing*, vol. 17, pp. 1624-1639, September 2008.

J. Chen, J. Zheng, and Y. He, "Macroblock-level adaptive frequency weighting for perceptual video coding," *IEEE Trans. on Consumer Electronics*, vol. 53, pp. 775781, May. 2007.

L. Chen and I. Garbacea, "Adaptive Lambda estimation in Lagrangian rate-distortion optimization for video coding," *Proc. SPIE*, vol. 6077, pp. 60772B 1-8, 2006.

Z. Chen and C. Guillemot, "Perceptually-friendly H.264/AVC video coding based on foveated just-noticeable-distortion model,' *IEEE Trans. on Circuits and Systems for Video Technology*, vol. 20, pp. 806-819, June 2010.

H. Gish and J. Pierce, "Asymptotically efficient quantizing," *IEEE Trans. on Information Theory*, vol. 14, pp. 676-683, October 1968.

Z. He and S. Mitra, "Optimum bit allocation and accurate rate control for video coding via rho-domain source modeling," *IEEE Trans. on Circuits and Systems for Video Technology*, vol. 12, pp. 840-849. October 2002.

Y. Huang, et al., "Perceptual Rate-Distortion Optimization Using Structural Similarity Index as Quality Metric", *IEEE Trans. on Circuits and Systems for Video Technology*, vol. 20, pp. 58-68, November 2010.

M. Jiang and N. Ling, "On Lagrange multiplier and quantizer adjustment for H.264 frame-layer video rate control," *IEEE Trans. on Circuits and Systems for Video Technology*, vol. 16, pp. 663-669, May 2006.

*JVT Advanced Video Coding (AVC)*. ITU-T Rec. H.264 and ISO/IEC 14496-10 (MPEG-4 Part 10), 2004.

M. Karczewicz, Y. Ye, and I. Chong, "Rate distortion optimized quantization." *VCEG-AH*21, January 2008.

D. Kwon, M. Shen, and C. Kuo, "Rate control for H.264 video with enhanced rate and distortion models," *IEEE Trans. on Circuits and Systems for Video Technology*, vol. 17, pp. 517-529, May 2007.

X. Li, N. Oertel, A. Hutter, and A. Kaup, "Laplace distribution based Lagrangian rate distortion optimization for hybrid video coding," *IEEE Trans. on Circuits and Systems for Video Technology*, vol. 19, pp. 193-205, February 2009.

Z. Mai, C. Yang, K. Kuang, and L. Po, "A novel motion estimation method based on structural similarity for H.264 inter prediction," *IEEE International Conference on Acoustics, Speech, and Signal Processing*, vol. 2, pp. 913-916, 2006.

Z. Mai, C. Yang, L. Po, and S. Xie, "A new rate-distortion optimization using structural information in H.264 I-frame encoder;' *Proc. ACIVS*, pp. 435-441. 2005.

Z. Mai, C. Yang, and S. Xie, "Improved best prediction mode(s) selection methods based on structural similarity in H.264 I-frame encoder." *IEEE International Conference on Systems, Man and Cybernetics*, pp. 2673-2678, 2005.

T. On, Y. Huang, and H. Chen, "A perceptual-based approach to bit allocation for H.264 encoder," *SPIE Visual Communications and Image Processing*, July 2010.

F. Pan, Y. Sun, Z. Lu, and A. Kassim, "Complexity-based rate distortion optimization with perceptual tuning for scalable video coding," *International Conference on Image Processing*, 2005.

G. J. Sullivan and T. Wiegand, "Rate-distortion optimization for video compression." *IEEE Signal Processing Magazine*, vol. 15. pp. 74-90, November 1998.

C. Sun, H.-J. Wang, and H. Li, "Macroblock-level rate-distortion optimization with perceptual adjustment for video coding." *Proc. IEEE DCC*, p. 546, 2008.

T. Suzuki, P. Kuhn, and Y. Yagasaki, "Quantization tools for high quality video," *Joint Video Team of ISO/IEC MPEG and ITU-T VCEG JVT-B067*, January 2002.

Toshiba, "Adaptive quantization matrix selection," in *ITU WP3/SCI6 Delayed contribution 267*, T05-SG16-060403-D-0266, Geneva, April 2006.

M. Wang and B. Yin, "Lagrangian multiplier based joint three-layer rate control for H.264/AVC," *IEEE Signal Process. Lett.*, vol. 16, pp. 679-682, August 2009.

S. Wang, S. Ma. and W. Gao, "SSIM based perceptual distortion rate optimization coding," in *SPIE Visual Communications and Image Processing (VCIP)*, July 2010.

Z. Wang, A. C. Bovik, H. R. Sheikh, and E. P. Simoncelli, "Image quality assessment: From error visibility to structural similarity," *IEEE Trans. on Image Processing*, vol. 13, pp. 600-612, April 2004.

Z. Wang and A. Bovik, "Mean squared error: love it or leave it?—a new look at signal fidelity measures." *IEEE Signal Processing Magazine*, vol. 26, pp. 98-117. January 2009.

Z. Wang, L. Lu, and A. C. Bovik, "Video quality assessment based on structural distortion measurement," *Signal Processing: Image Communication*, vol. 19, pp. 121-132, February 2004.

Z. Wang and Q. Li, "Video quality assessment using a statistical model of human visual speed perception," *Journal of the Optical Society of America A*, vol. 24, pp. B61-B69, December 2007.

T. Wiegand, H. Schwarz, A. Joch, F. Kossentini, and G. J. Sullian, "Rate constrained coder control and comparison of video coding standards," *IEEE Trans. on Circuits and Systems for Video Technology*, vol. 13, pp. 688-703, July 2003.

T. Wiegand and B. Girod, "Lagrange multiplier selection in hybrid video coder control." *IEEE International Conference on Image Processing*, pp. 542-545, 2001.

E. Yang and X. Yu. "Rate distortion optimization for H.264 inter-frame video coding: A general framework and algorithms." *IEEE Trans. on Image Processing*, vol. 16, pp. 1774-1784, July 2007.

C. Yang, H. Wang, and L. Po, "Improved inter prediction based on structural similarity in H.264," *IEEE International Conference on Signal Processing and Communications*, vol. 2, pp. 340-343, 2007.

X. Yang, W. Lin, Z. Lu. E. Ong, and S. Yao, "Motion-compensated residue pre-processing in video coding based on just-noticeable distortion profile," *IEEE Trans. on Circuits and Systems for Video Technology*, vol. 15, pp. 742-752, June 2005.

J. Zhang, X. Yi, N. Ling, and W. Shang, "Context adaptive Lagrange multiplier (CALM) for rate-distortion optimal motion estimation in video coding," *IEEE Trans. on Circuits and Systems for Video Technology*, vol. 20, pp. 820-828, June. 2010.

X. Zhao, L. Zhang. S. Ma, and W. Gao. "Rate-distortion optimized transform for intra-frame coding," *Proceedings of IEEE International Conference on Acoustics, Speech and Signal Processing*, pp. 1414-1417, March 2010.

E. Yang and X. Yu, "Soft decision quantization for H.264 with main profile compatibility," *IEEE Trans. on Circuits and Systems. for Video Technology*, vol. 19, pp. 122-127, January 2009.

J. Zhang, X. Yi, N. Ling, and W. Shang, "Context adaptive Lagrange multiplier (CALM) for motion estimation in JM-improvement," *Joint Video Team (JVT) of ISO/IEC MPEG ITU-T VCEG.* July 2006.

X. Yang, W. Lin, Z. Lu. E. Ong, and S. Yao, "Just noticeable distortion model and its applications in video coding." *Signal Processing: Image Communication*, vol. 22, pp. 662-680, August 2005.

What is claimed is:

1. A computer-implemented method of video coding with rate-distortion optimization, comprising:
   estimating, by a processor, a derivative of the structural similarity (SSIM) quality measure with respect to a quantization step Q using a reduced-reference SSIM model that utilizes a source video only;
   estimating, by the processor, a derivative of the data rate R with respect to the quantization step Q;
   minimizing, by the processor, a joint cost function defined as a sum of the data rate and one minus SSIM;
   utilizing, by the processor, a Lagrange parameter to control a trade-off between the data rate term and the SSIM term;
   determining, by the processor, an optimal Lagrange parameter based on a ratio between the estimated derivative of SSIM with respect to Q and the derivative of R with respect to Q; and
   utilizing, by the processor, the determined Lagrange parameter to encode the source video.

2. The method of claim 1, wherein the method further comprises
   estimating the derivative of data rate R with respect to quantization step Q by:
   including, by the processor, both source and header information bits in the total count of data rate R;
   utilizing, by the processor, a prior statistical model of transform coefficients to compute the entropy of transform coefficients; and
   utilizing, by the processor, entropy, quantization step, and parameters of the prior statistical model to estimate the data rate.

3. The method of claim 1, before utilizing the Lagrange parameter to encode the source video, further comprising:
   estimating, by the processor, the local perceptual motion information content of each macroblock;
   utilizing, by the processor, a global motion of the frame, and the absolute and relative motion of the macroblock;
   estimating, by the processor, the perceptual uncertainty of visual motion speed perception utilizing the global motion of the frame;
   computing, by the processor, a perceptual weight for each macroblock utilizing the estimated local motion information content and perceptual uncertainty of visual motion speed perception; and
   adjusting, by the processor, the Lagrange parameter for each macroblock utilizing the perceptual weight.

4. The method of claim 1, comprising:
   computing, by the processor, frame level SSIM values from a previous pass;
   dividing, by the processor, a video sequence into group-of-pictures (GOPs) by grouping neighboring frames with similar SSIM values within individual GOPs;
   ranking, by the processor, the GOPs in ascending order based on the average SSIM values of all frames in individual GOPs;
   determining, by the processor, an overall quality by a weighted sum of GOP level SSIM values where more weights are given to the GOPs with lower SSIM averages;
   adjusting, by the processor, the GOP level QP values based on a curve of SSIM versus frame number for each GOP, so as to achieve an optimal quality model; and
   utilizing, by the processor, the determined GOP level QP values to perform video encoding in the current pass.

5. The method of claim 1, wherein the method comprises:
   utilizing, by the processor, a pre-specified frame-level quality target defined by a SSIM value;
   adjusting, by the processor, the QP of each frame to achieve constant frame-level SSIM quality according to the difference between the target SSIM value and the SSIM value of the previous frame, where if the target SSIM value is higher, then the QP is decreased, and vice versa; and
   utilizing, by the processor, the determined frame-level QP to perform encoding of the current frame.

6. The method of claim 1, comprising:
   utilizing, by the processor, a pre-specified frame-level quality target defined by SSIM;
   adjusting, by the processor, QP of each frame to achieve constant frame-level SSIM quality by finding the quantization level that achieves the pre-specified SSIM target quality using the reduced-reference SSIM model; and
   utilizing, by the processor, the determined frame-level QP to perform encoding of the current frame.

7. The method of claim 1, wherein the method further comprises constructing a reduced-reference SSIM model by:
   utilizing, by the processor, transform domain coefficients to model SSIM;
   grouping, by the processor, the transform coefficients corresponding to the same frequency to subbands;
   performing, by the processor, variance statistics of the subbands; and
   utilizing, by the processor, the variance statistics of transform coefficient subbands to compute a statistical reduced-reference SSIM estimation.

8. The method of claim 7, further comprising:
   utilizing, by the processor, the variance of each transform coefficient subband to normalize the mean squared error (MSE) of the corresponding transform coefficient subband;
   utilizing, by the processor, the normalized subband MSE values of all subbands to estimate a reduced-reference SSIM value.

9. A non-transitory computer readable medium storing computer code that when executed on a device adapts the device to perform the method of claims 1, 6 to 7, and 8.

10. A computer-implemented system for video coding with rate-distortion optimization, the system comprising a processor configure to:
   estimate a derivative of a structural similarity (SSIM) quality measure with respect to a quantization step Q using a reduced-reference SSIM model that utilizes a source video only;
   estimate a derivative of the data rate R with respect to the quantization step Q;
   minimize a joint cost function defined as a sum of the data rate and one minus SSIM
   utilize a Lagrange parameter to control a trade-off between the data rate term and the SSIM term;
   determine an optimal Lagrange parameter based on a ratio between the estimated derivative of SSIM with respect to Q and the derivative of R with respect to Q; and
   utilize the determined Lagrange parameter to encode the source video.

11. The system of claim 10, wherein the processor is further configured to perform estimating the derivative of data rate R with respect to quantization step Q by:
- including both source and header information bits in the total count of data rate R;
- utilizing a prior statistical model of transform coefficients to compute the entropy of transform coefficients; and
- utilizing entropy, quantization step, and parameters of the prior statistical model to estimate the data rate.

12. The system of claim 10, before utilizing the Lagrange parameter to encode the video, the processor is further configured to perform:
- estimating the local perceptual motion information content of each macroblock;
- utilizing a global motion of the frame, and the absolute and relative motion of the macroblock;
- estimating the perceptual uncertainty of visual motion speed perception utilizing the global motion of the frame;
- computing a perceptual weight for each macroblock utilizing the estimated local motion information content and perceptual uncertainty of visual motion speed perception; and
- adjusting the Lagrange parameter for each macroblock utilizing the perceptual weight.

13. The system of claim 10, wherein the processor is further configured to perform:
- computing frame level SSIM values from a previous pass;
- dividing a video sequence into group-of-pictures (GOPs) by grouping neighboring frames with similar SSIM values within individual GOPs;
- ranking the GOPs in ascending order based on the average SSIM values of all frames in individual GOPs;
- determining an overall quality by a weighted sum of GOP level SSIM values where more weights are given to the GOPs with lower SSIM averages;
- adjusting the GOP level QP values based on a curve of SSIM versus frame number for each GOP, so as to achieve an optimal quality model; and
- utilizing the determined GOP level QP values to perform video encoding in the current pass.

14. The system of claim 10, wherein the processor is further configured to perform:
- utilizing a pre-specified frame-level quality target defined by a SSIM value;
- adjusting the QP of each frame to achieve constant frame-level SSIM quality according to the difference between the target SSIM value and the SSIM value of the previous frame, where if the target SSIM value is higher, then the QP is decreased, and vice versa; and
- utilizing the determined frame-level QP to perform encoding of the current frame.

15. The system of claim 10, wherein the processor is further configured to perform:
- utilizing a pre-specified frame-level quality target defined by SSIM;
- adjusting QP of each frame to achieve constant frame-level SSIM quality by finding the quantization level that achieves the pre-specified SSIM target quality using the reduced-reference SSIM model; and
- utilizing the determined frame-level QP to perform encoding of the current frame.

16. The system of claim 10, wherein the processor is further configured to perform constructing a reduced-reference SSIM model by:
- utilizing transform domain coefficients to model SSIM;
- grouping the transform coefficients corresponding to the same frequency to subbands;
- performing variance statistics of the subbands; and
- utilizing the variance statistics of transform coefficient subbands to compute a statistical reduced-reference SSIM estimation.

17. The system of claim 16, wherein the processor is further configured to perform:
- utilizing the variance of each transform coefficient subband to normalize the mean squared error (MSE) of the corresponding transform coefficient subband;
- utilizing the normalized subband MSE values of all subbands to estimate a reduced-reference SSIM value.

* * * * *